(12) United States Patent
Sanno

(10) Patent No.: US 11,496,670 B2
(45) Date of Patent: Nov. 8, 2022

(54) ELECTRONIC DEVICE WITH DISPLAY SCREEN CAPABLE OF RELIABLE DETECTION OF A USER SELECTED DISPLAYED EYE REGION IN A SCENE TO BE CAPTURED, AND REGION SELECTION METHOD

(71) Applicant: CANON KABUSHIKI KAISHA, Tokyo (JP)

(72) Inventor: Masato Sanno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 251 days.

(21) Appl. No.: 16/575,666

(22) Filed: Sep. 19, 2019

(65) Prior Publication Data

US 2020/0099853 A1    Mar. 26, 2020

(30) Foreign Application Priority Data

Sep. 21, 2018   (JP) .............................. JP2018-178077

(51) Int. Cl.
*H04N 5/232*    (2006.01)
*G06V 40/16*    (2022.01)
*G06V 40/19*    (2022.01)

(52) U.S. Cl.
CPC ....... *H04N 5/23219* (2013.01); *G06V 40/165* (2022.01); *G06V 40/166* (2022.01);
(Continued)

(58) Field of Classification Search
CPC ........... H04N 1/00411; H04N 5/23216; H04N 5/23293; H04N 5/232933;
(Continued)

(56) References Cited

U.S. PATENT DOCUMENTS

| | | | | |
|---|---|---|---|---|
| 6,888,567 | B2 * | 5/2005 | Watanabe | ........ H04N 5/232945 348/346 |
| 8,106,999 | B2 * | 1/2012 | Izawa | .................... G03B 13/36 348/346 |

(Continued)

FOREIGN PATENT DOCUMENTS

| | | |
|---|---|---|
| JP | 2012-123301 A | 6/2012 |
| JP | 2013-070164 A | 4/2013 |

OTHER PUBLICATIONS

The above foreign patent document was cited in the May 16, 2022 Japanese Office Action, which is enclosed with an English Translation, that issued in Japanese Patent Application No. 2018-178077.

*Primary Examiner* — Twyler L Haskins
*Assistant Examiner* — Akshay Trehan
(74) *Attorney, Agent, or Firm* — Cowan, Liebowitz & Latman, P.C.

(57) ABSTRACT

An electronic device is provided with a detecting unit for detecting a face and an eye from an image; an obtaining unit for obtaining a position designated by a user on a display screen on which the image is displayed; a setting unit for setting a left region for selecting a left eye of a face specified by the position designated and a right region for selecting a right eye of the face; and a selecting unit for selecting an eye region of a corresponding eye when the position designated is present in the left region or the right region. The setting unit extends a region for selecting, out of eyes of the specified face, an eye closer to an edge of the specified face when a predetermined condition is satisfied.

16 Claims, 16 Drawing Sheets

(52) U.S. Cl.
CPC ............ *G06V 40/171* (2022.01); *G06V 40/19* (2022.01); *H04N 5/232127* (2018.08)

(58) Field of Classification Search
CPC ....... H04N 5/232935; H04N 5/232939; H04N 5/232941; H04N 5/232945; H04N 5/23219; H04N 5/23212; H04N 5/232127; G06K 9/00255; G06K 9/00604; G06K 9/00281; G06K 9/00248; G06F 3/0416; G02F 1/13338; G06V 40/165; G06V 40/166; G06V 40/171; G06V 40/19
USPC ............................................ 348/333.01, 346
See application file for complete search history.

(56) References Cited

U.S. PATENT DOCUMENTS

| | | | | |
|---|---|---|---|---|
| 2003/0071908 A1* | 4/2003 | Sannoh | ............ | H04N 5/232945 348/E5.038 |
| 2007/0064145 A1* | 3/2007 | Sugimoto | ........ | H04N 5/232127 348/E5.045 |
| 2009/0091633 A1* | 4/2009 | Tamaru | .............. | H04N 5/23219 348/208.14 |
| 2012/0147252 A1* | 6/2012 | Kunishige | ........ | H04N 5/232945 348/E5.045 |
| 2013/0070142 A1* | 3/2013 | Okazawa | ........... | H04N 5/23216 348/333.01 |
| 2013/0286217 A1* | 10/2013 | Tsuji | ...................... | G06V 40/16 348/169 |
| 2016/0295100 A1* | 10/2016 | Yokozeki | ........... | H04N 5/23218 |
| 2017/0118405 A1* | 4/2017 | Song | ...................... | H04N 5/235 |
| 2017/0289441 A1* | 10/2017 | Zhang | .............. | H04N 5/232123 |

\* cited by examiner

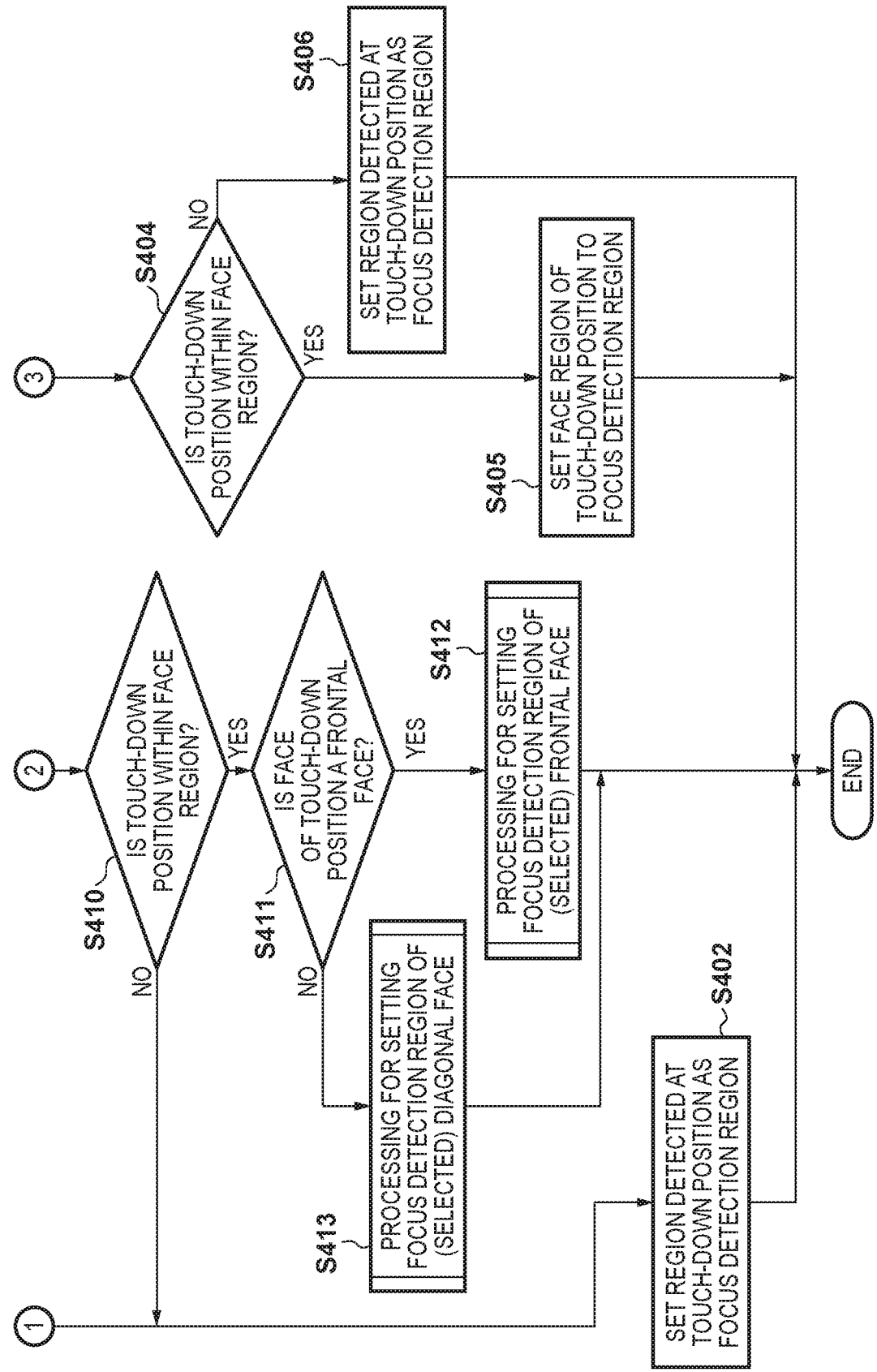

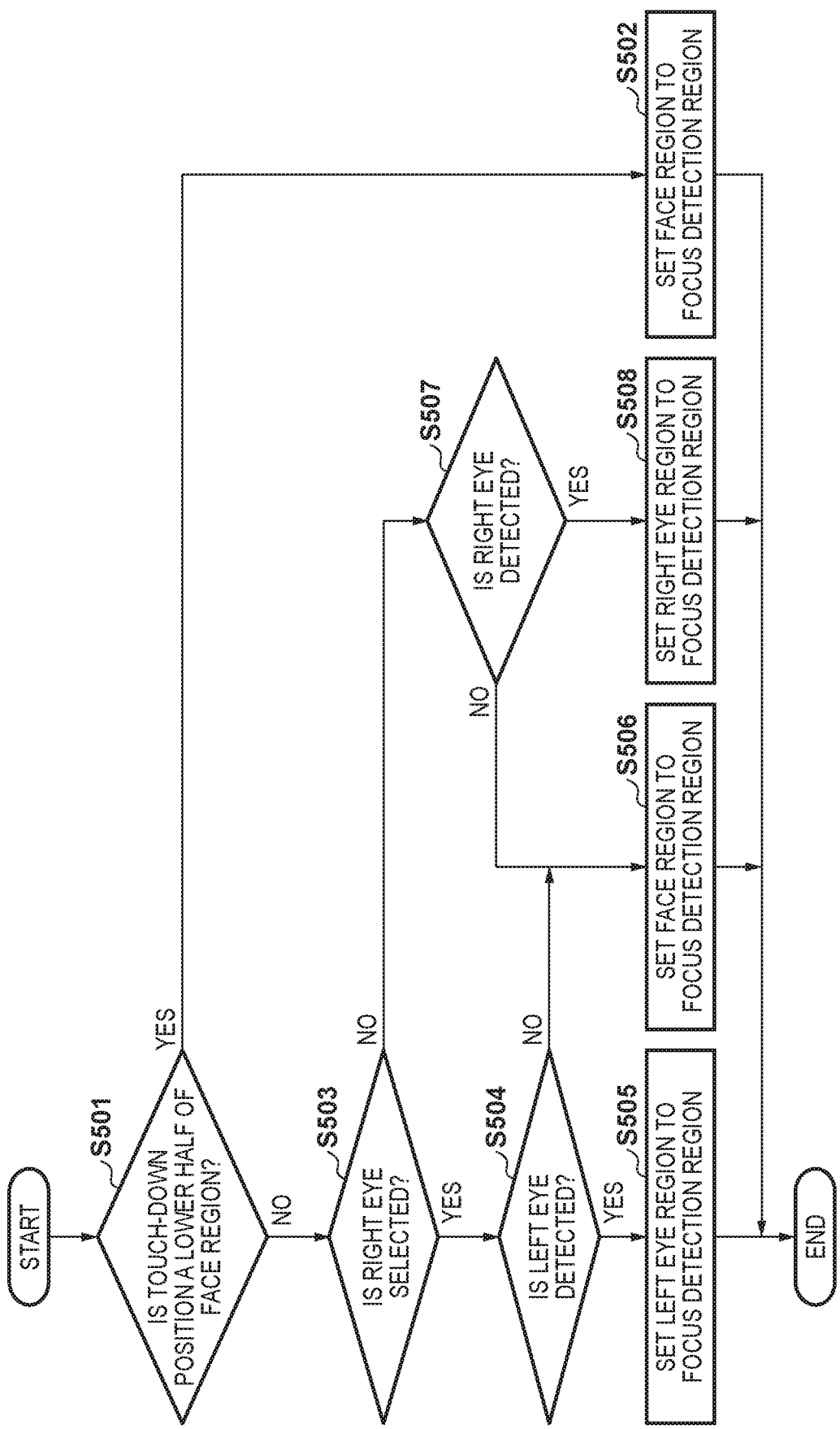

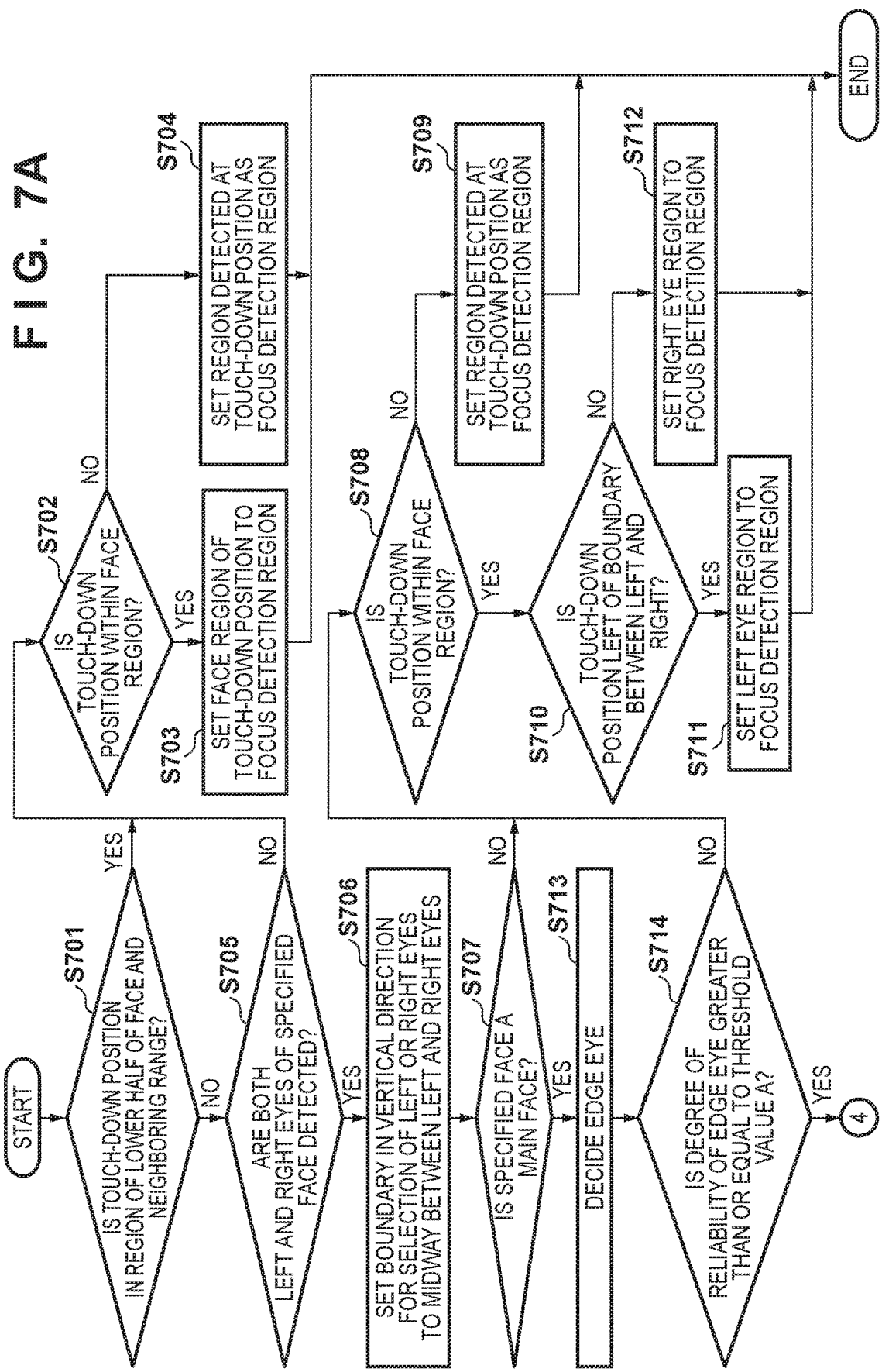

F I G. 8

| FACE SIZE (HORIZONTAL) | |
|---|---|
| LESS THAN 10pix | 0 |
| UP TO 20pix | 10 |
| UP TO 30pix | 20 |
| UP TO 40pix | 30 |
| UP TO 40pix | 40 |
| 50pix OR MORE | 50 |

| FACE POSITION FROM CENTER OF ANGLE OF VIEW | |
|---|---|
| LESS THAN 10% | 50 |
| UP TO 20% | 40 |
| UP TO 30% | 30 |
| UP TO 40% | 20 |
| UP TO 50% | 10 |
| 50% OR MORE | 5 |

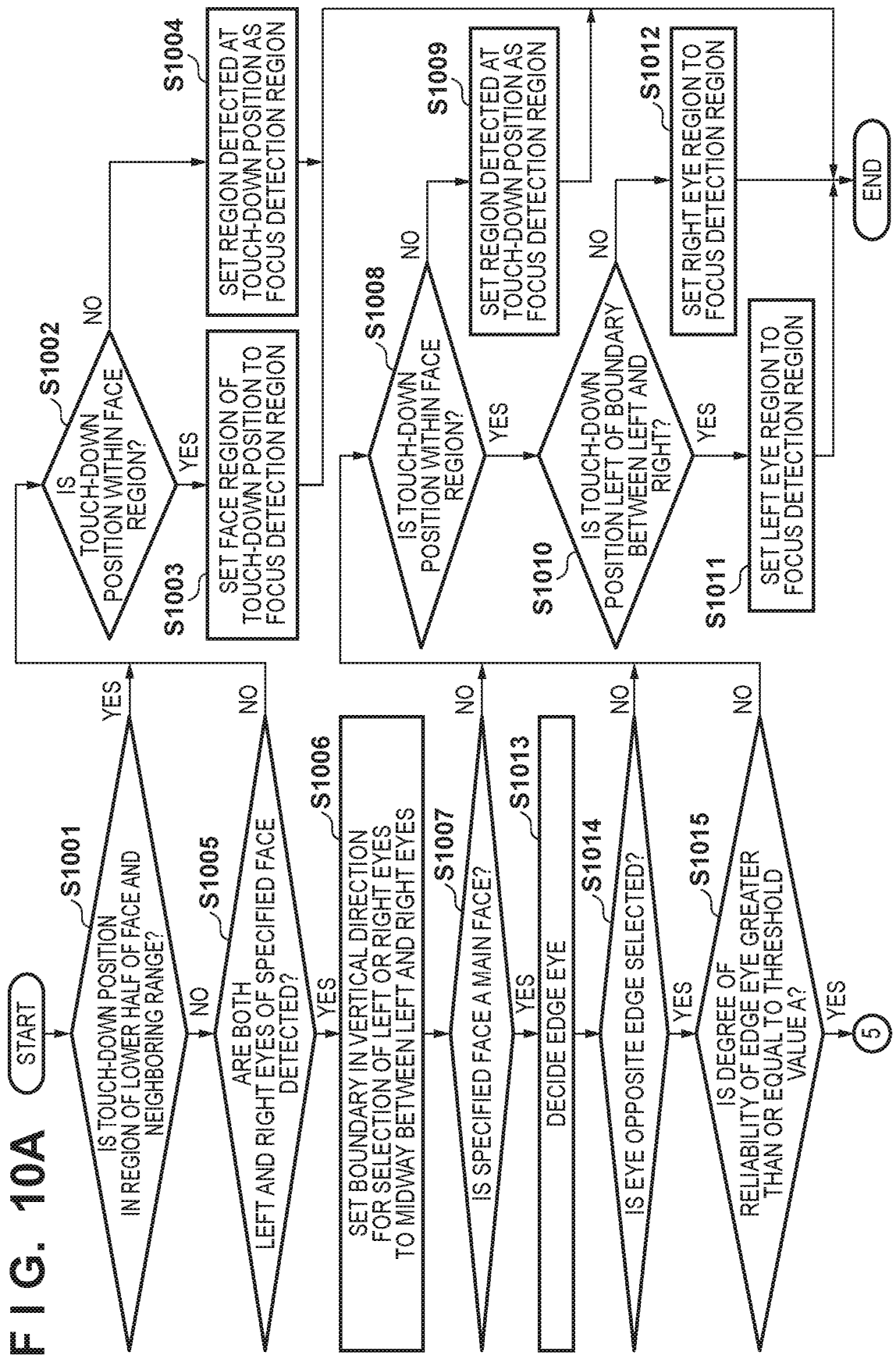

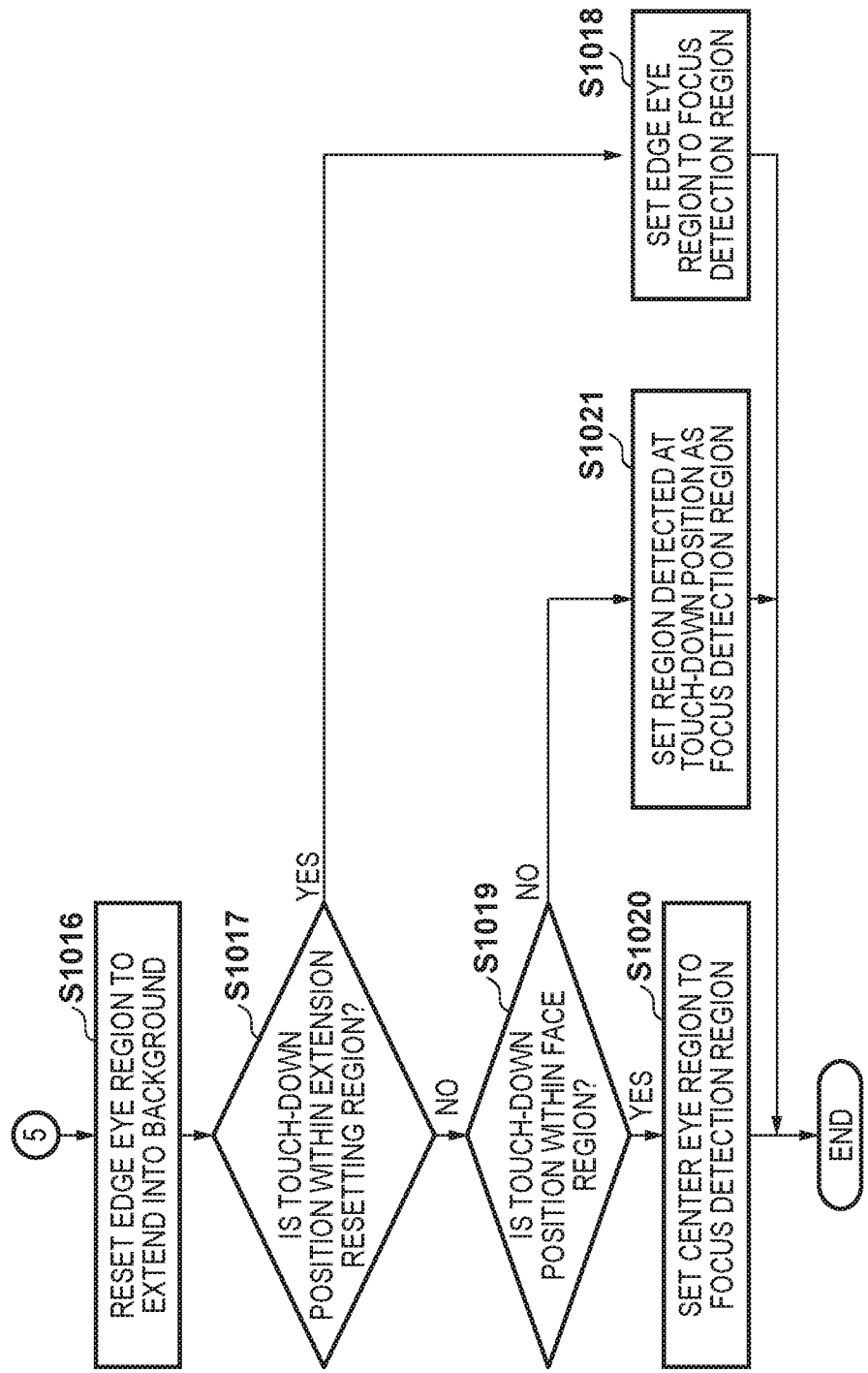

ELECTRONIC DEVICE WITH DISPLAY SCREEN CAPABLE OF RELIABLE DETECTION OF A USER SELECTED DISPLAYED EYE REGION IN A SCENE TO BE CAPTURED, AND REGION SELECTION METHOD

BACKGROUND OF THE INVENTION

Field of the Invention

The present invention relates to an electronic device and a region selection method.

Description of the Related Art

In a digital camera (hereinafter referred to as a camera), a function of autofocusing (AF) on an object automatically detected by the camera or an object arbitrarily selected by a user is known. In particular, in cameras of the past few years, AF to a more precise position of an object that is realized by detecting an organ of a face (for example, an eye or the like) rather than just detecting the face as an object.

It is important that such a camera have a specification to enable a user to select whether a face is set as an AF target position or an eye is set as an AF target position to thereby enable the user's intention to be better reflected. For example, Japanese Patent Laid-Open No. 2013-070164 describes a technique in which a user touches an LCD screen, it is determined whether the touch position is a face or an eye, and one of the face and the eye is selected as an AF target. In Patent Document 1, when the size of the eye on the LCD screen is small, a selection reaction region of the eye with respect to a touch is widened. As a result, since the user can easily designate the eye as an AF target position in accordance with a capturing scene, a camera with high usability can be realized.

However, in Japanese Patent Laid-Open No. 2013-070164, when the selection region for an eye is widened in accordance with being a small eye, the selection region for the eye may include a background when the eye is at an edge of a face region such as when the face is turned. In such a case, a physical object located near the eye cannot be selected as a focus detection region.

SUMMARY OF THE INVENTION

In one aspect of the present invention, a technique that enables region selection that more reliably reflects a user's intent is provided.

According to one aspect of the present invention, there is provided an electronic device comprising: at least one memory and at least one processor which function as: a detecting unit configured to detect a face and an eye from an image; an obtaining unit configured to obtain a position designated by a user on a display screen on which the image is displayed; a setting unit configured to set a left region for selecting a left eye of a face specified by the position designated and a right region for selecting a right eye of the face; and a selecting unit configured to select an eye region of a corresponding eye when the position designated is present in the left region or the right region, wherein, in a case where a predetermined condition is satisfied, the setting unit extends a region for selecting, out of eyes of the specified face, an eye closer to an edge of the specified face, and the predetermined condition includes at least one of the specified face satisfying a condition for becoming a main object, a degree of reliability of detection as the eye closer to the edge of the specified face being equal to or greater than a predetermined value, and the eye further from the edge of the specified face being selected.

According to another aspect of the present invention, there is provided an electronic device comprising: at least one memory and at least one processor which function as: a detecting unit configured to detect a face and an eye from an image; an obtaining unit configured to obtain a position designated by a user on a display screen on which the image is displayed; a setting unit configured to set a left region for selecting a left eye of a face specified by the position designated and a right region for selecting a right eye of the face; and a selecting unit configured to select an eye region of a corresponding eye when the position designated is present in the left region or the right region, wherein, in a case where one eye of the specified face is selected, the setting unit does not set a selection region for the selected one eye, and sets a selection region for selecting the other eye that is not selected of the face, or selecting the face without selecting an eye of the face.

According to another aspect of the present invention, there is provided an electronic device, comprising: at least one memory and at least one processor which function as: a detecting unit configured to detect a face and an eye from an image; an accepting unit configured to accept an operation for designating a position in a display screen in which the image is displayed; and a control unit configured to perform control to, in response to accepting an operation that designates a position corresponding to a region of the face detected by the detecting unit, set, as a selection region, an unselected eye from out of a left eye and a right eye included in a region of a designated face, wherein each time an operation for designating a position corresponding to the region of the same face is accepted, the control unit alternatingly sets a region of the right eye and a region of the left eye as the selection region.

According to another aspect of the present invention, there is provided a region selection method in accordance with an electronic device, the method comprising: detecting a face and an eye from an image; obtaining a position designated by a user on a display screen on which the image is displayed; setting a left region for selecting a left eye of a face specified by the position designated and a right region for selecting a right eye of the face; and selecting an eye region of a corresponding eye when the position designated is present in the left region or the right region, wherein in a case where a predetermined condition is satisfied, the setting extends a region for selecting an eye closer to an edge of the specified face, and the predetermined condition includes at least one of the specified face satisfying a condition for becoming a main object, a degree of reliability of detecting an eye as the eye closer to the edge of the specified face being equal to or greater than a predetermined value, and the eye further from the edge of the specified face being selected as a focus detection region.

According to another aspect of the present invention, there is provided a region selection method in accordance with an electronic device, the method comprising: detecting a face and an eye from an image; obtaining a position designated by a user on a display screen on which the image is displayed; setting a left region for selecting a left eye of a face specified by the position designated and a right region for selecting a right eye of the face; and selecting an eye region of a corresponding eye when the position designated is present in the left region or the right region, wherein, in a case where one eye of the specified face is selected as a focus detection region, the setting does not set a selection region for the selected one eye, and sets a selection region for selecting the other eye that is not selected of the face, or selecting the face without selecting an eye of the face.

According to another aspect of the present invention, there is provided a region selection method in accordance with an electronic device, the method comprising: detecting a face and an eye from an image; accepting an operation for designating a position in a display screen in which the image is displayed; and performing control to, in response to accepting an operation that designates a position corresponding to a region of the detected face, set, as a selection region, an unselected eye from out of a left eye and a right eye included in a region of a designated face, wherein each time an operation for designating a position corresponding to the region of the same face is accepted, the control alternatingly sets a region of the right eye and a region of the left eye as the selection region.

According to another aspect of the present invention, there is provided a non-transitory computer-readable storage medium storing a computer program for causing a computer to execute one of the above-described region selection methods.

Further features of the present invention will become apparent from the following description of exemplary embodiments with reference to the attached drawings.

BRIEF DESCRIPTION OF THE DRAWINGS

FIGS. 4A and 4B are flowcharts illustrating a process of manually setting a focus detection region in the embodiment.

FIG. 5 is a flowchart illustrating processing for setting a focus detection region for a (selected) frontal face.

FIGS. 7A and 7B are flowcharts illustrating processing for setting a focus detection region for a (non-selected) diagonal face.

FIG. 8 is a view illustrating an example of evaluation values for deciding a main face in the embodiment.

FIGS. 10A and 10B are flowcharts illustrating processing for setting a focus detection region for a (selected) diagonal face.

DESCRIPTION OF THE EMBODIMENTS

Embodiments of the present invention will be described below with reference to the drawings. The embodiment described below takes as an example a case where an electronic device according to the present invention and a method of controlling the same are applied to a digital camera capable of capturing a still image or a moving image.

Figure 1A:
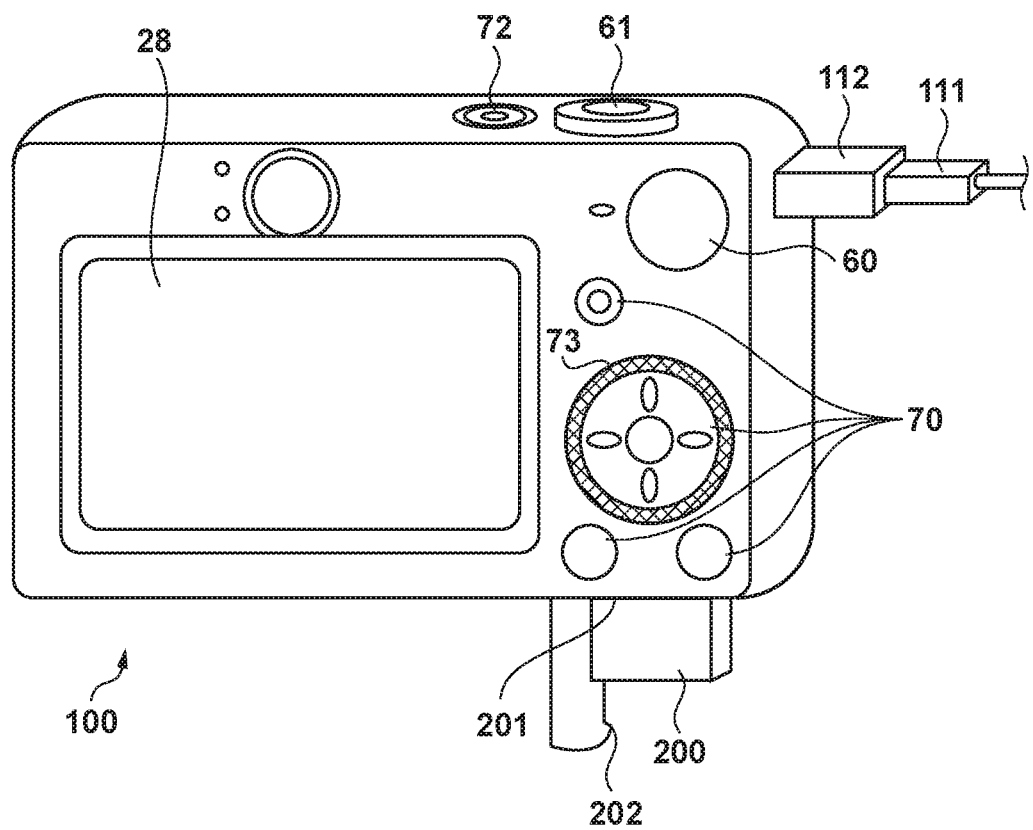
FIG. 1A is an external view of a camera in an embodiment.
Figure 1B:
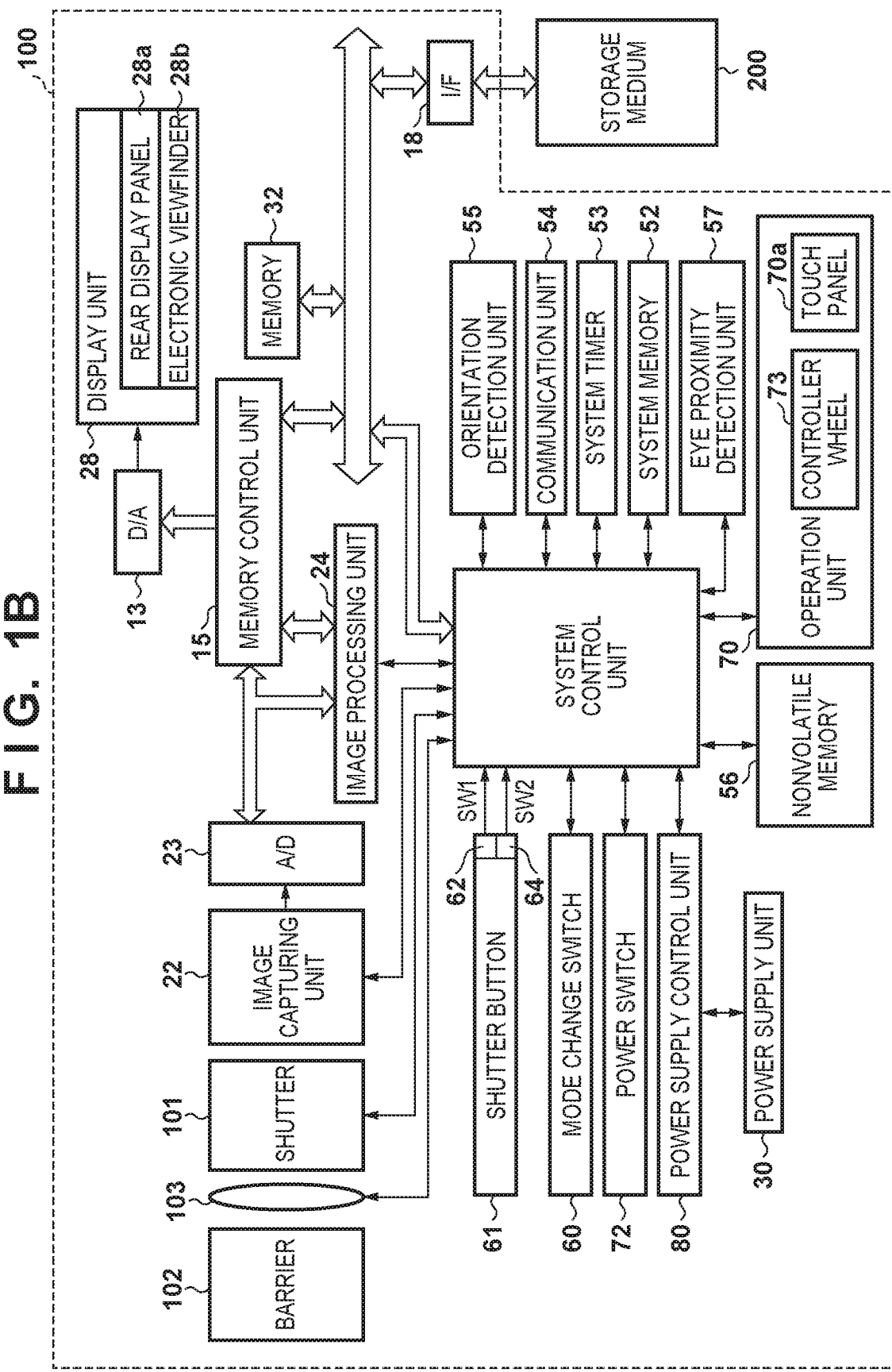
FIG. 1B is a functional block diagram illustrating an example of a configuration of the camera in the embodiment.

FIG. 1A illustrates a rear external view of a digital camera 100 as an example of an image capturing apparatus according to the present embodiment. A display unit 28 is a display unit for displaying images and various information. The display unit 28 includes a rear display panel 28a and an electronic viewfinder 28b, which is a display unit in the viewfinder, as illustrated by FIG. 1B. A shutter button 61 is an operation unit for instructing capturing. A mode changeover switch 60 is an operation unit for switching between various modes. A connector 112 is a connector for connecting the digital camera 100 to a connection cable 111 for connecting to an external device such as a personal computer or a printer. An operation unit 70 includes operation members such as various switches, buttons, and a touch panel for receiving various operations from a user. A controller wheel 73 is an operation member that is rotatably operable and is included in the operation unit 70. A power switch 72 is a push button for switching between power on and power off.

A storage medium 200 includes, for example, a memory card, a hard disk, or the like, and stores, for example, an image captured by the digital camera 100. A storage medium slot 201 is a slot for removably holding the storage medium 200. The storage medium 200 stored in the storage medium slot 201 can communicate with the digital camera 100 to enable recording and reproduction. A cover 202 is a cover of the storage medium slot 201. FIG. 1A illustrates a state in which the cover 202 is open, and a portion of the storage medium 200 has been taken out from the storage medium slot 201 and exposed.

FIG. 1B is a block diagram illustrating an example of the configuration of the digital camera 100 according to the present embodiment. In FIG. 1B, an image capturing lens 103 is a lens group that includes a zoom lens and a focus lens. A shutter 101 is a shutter having an aperture function. An image capturing unit 22 is an image capturing element configured by a CCD, a CMOS device, or the like for converting an optical image into an electric signal. An A/D converter 23 converts an analog signal into a digital signal. The A/D converter 23 is used to convert an analog signal outputted from the image capturing unit 22 into a digital signal. A barrier 102 covers the image capturing system that includes the image capturing lens 103 of the digital camera 100 to thereby preventing contamination and breakage of the image capturing system that includes the image capturing lens 103, the shutter 101, and the image capturing unit 22.

An image processing unit 24 performs resizing processing such as predetermined pixel interpolation or reduction, and color conversion processing on data from the A/D converter 23 or data from a memory control unit 15. The image processing unit 24 performs predetermined computation processing using captured image data. Based on a computation result obtained by the image processing unit 24, a system control unit 50 performs exposure control and distance measurement control. Thereby, TTL (through-the-lens) type AF (Auto Focus) processing, AE (Auto Exposure) processing, and EF (Flash pre-emission) processing are performed. The image processing unit 24 further performs predetermined computation processing using the captured image data, and performs TTL type automatic white balance (AWB) processing based on the obtained computation result. The image processing unit 24 also functions as a detection unit that detects a face and eyes from image data in cooperation with the system control unit 50.

Output data from the A/D converter 23 is directly written to the memory 32 via the image processing unit 24 and the memory control unit 15 or via the memory control unit 15. The memory 32 stores, for example, image data that has been obtained by the image capturing unit 22 and converted into digital data by the A/D converter 23, and image data to be displayed on the display unit 28. The memory 32 has a storage capacity sufficient to store a predetermined number of still images and moving images and audio for a predetermined period of time.

The memory 32 also serves as a memory for displaying images (a video memory). A D/A converter 13 converts the image display data stored in the memory 32 into an analog signal and supplies the analog signal to the display unit 28. Thus, the image data for display that has been written to the memory 32 is displayed on the display unit 28 via the D/A converter 13. The display unit 28 performs display in accordance with an analog signal from the D/A converter 13 on a display device such as an LCD. Digital signals that have been A/D converted by the A/D converter 23 and stored in the memory 32 are converted into analog signals by the D/A converter 13, and are sequentially transferred to the display unit 28 for display, whereby through image display (live view display (LV display)) can be performed. Hereinafter, an image displayed in a live view may be referred to as an LV image.

A nonvolatile memory 56 is a memory that is an electrically erasable/recordable recording medium, and, for example, an EEPROM or the like is used. The nonvolatile memory 56 stores constants, programs, and the like for the operation of the system control unit 50. Here, the programs are computer programs for executing various flowcharts described later in the present embodiment.

The system control unit 50 is at least one processor or circuit that controls the entire digital camera 100. By executing the programs recorded in the nonvolatile memory 56 described above, each process of the present embodiment described later is realized. A RAM, for example, is used as a system memory 52. Constants and variables for the operation of the system control unit 50, programs read from the nonvolatile memory 56, and the like are deployed to the system memory 52. The system control unit 50 controls the memory 32, the D/A converter 13, the display unit 28, and the like to perform display control.

The system timer 53 is a timer unit that measures time used for various controls and time of a built-in clock. The mode changeover switch 60, the shutter button 61, and the operation unit 70 are operation units for inputting various operation instructions to the system control unit 50.

The mode changeover switch 60 switches the operation mode of the system control unit 50 to one of a still image recording mode, a moving image capturing mode, and a reproduction mode. Modes included in the still image recording mode include an auto mode, an auto scene discrimination mode, a manual mode, various scene modes serving as image capturing settings for each capturing scene, a program AE mode, a custom mode, and the like. The mode changeover switch 60 allows a user to directly switch to any of these modes. Alternatively, after once switching to a menu button by the mode changeover switch 60, any of these modes included in the menu button may be switched to by using another operation member. Similarly, the moving image capturing mode may include a plurality of modes.

The shutter button 61 has a first shutter switch 62 and a second shutter switch 64. The first shutter switch 62 is turned on during operation of the shutter button 61 provided in the digital camera 100 by a so-called half-press (image capturing preparation instruction) to generate a first shutter switch signal SW1. The first shutter switch signal SW1 starts operations such as AF (auto focus) processing, AE (auto exposure) processing, AWB (automatic white balance) processing, and EF (flash pre-emission) processing. The second shutter switch 64 is turned on when operation of the shutter button 61 completes with a so-called full press (a capturing instruction) to generate a second shutter switch signal SW2. In response to the second shutter switch signal SW2, the system control unit 50 starts a series of image capturing processing operations from readout of a signal from the image capturing unit 22 to writing of image data to the storage medium 200.

Operation members of the operation unit 70 acts as various function buttons by being assigned a function as appropriate for each scene in accordance with various function icons that are displayed on the display unit 28 being selected and operated, for example. Function buttons include, for example, exit buttons, return buttons, image feed buttons, jump buttons, a narrow-down button, attribute change buttons, etc. For example, when the menu button is pressed, various settable menu screens are displayed on the display unit 28. A user can intuitively perform various settings by using the menu screen displayed on the display unit 28 and the up, down, left, right four-direction buttons and a set button.

The controller wheel 73 is a rotatably operable operation member included in the operation unit 70, and is used, for example, when instructing a selection item together with a direction button. When the controller wheel 73 is rotatably operated, an electrical pulse signal is generated in accordance with the operation amount, and the system control unit 50 controls respective units of the digital camera 100 based on the pulse signal. The angle at which the controller wheel 73 is rotated, the number of rotations, and the like can be determined in accordance with the pulse signal. Note that the controller wheel 73 may be any operation member as long as a rotation operation can be detected. For example, the controller wheel 73 itself may be a dial operation member that rotates in response to a rotation operation by a user to generate a pulse signal. Alternatively, by being an operation member that includes a touch sensor, the controller wheel 73 may detect, for example, a rotation operation of a user's finger on the controller wheel 73 without the controller wheel 73 itself rotating (a so-called touch wheel).

A power supply control unit 80 is configured by a battery detection circuit, a DC-DC converter, a switch circuit for switching between blocks to be energized, and the like, and detects whether or not a battery is mounted, the type of the battery, and the remaining battery level. In addition, the power supply control unit 80 controls the DC-DC converter based on a detection result and instructions from the system control unit 50, and supplies required voltages to respective units including the storage medium 200 for a required period of time. A power supply unit 30 comprises a primary battery such as an alkaline battery or a lithium battery, a secondary battery such as a NiCd battery, a NiMH battery, or a Li battery, an AC adapter, or the like.

A storage medium I/F 18 is an interface with the storage medium 200 which is a memory card, a hard disk, or the like. The storage medium 200 is a storage medium such as a memory card for recording a captured image, and is configured by a semiconductor memory, an optical disk, a magnetic disk, or the like. A communication unit 54 is connected to wirelessly or by a wired cable, and performs transmission and reception of video signals, audio signals, and the like. The communication unit 54 can also be connected to a wireless LAN (Local Area Network) or the Internet. The communication unit 54 can transmit an image captured by the image capturing unit 22 (including a through image) and an image that was recorded on the storage medium 200, and can receive image data and other various information from an external device.

An orientation detection unit 55 detects the orientation of the digital camera 100 with respect to the direction of gravity. Based on the orientation detected by the orientation detection unit 55, it is possible to discriminate whether an image captured by the image capturing unit 22 is an image that was captured with the digital camera 100 held horizontally or vertically. The system control unit 50 can add orientation information corresponding to the orientation detected by the orientation detection unit 55 to the image file of an image captured by the image capturing unit 22, and can record the image after rotating the image. As the orientation detection unit 55, an acceleration sensor, a gyro sensor, or the like can be used.

An eye proximity detection unit 57 detects the approach (eye proximity) of an eye (a physical object). The system control unit switches display/non-display by the rear display panel 28a and the electronic viewfinder 28b in accordance with a state detected by the eye proximity detection unit 57. That is, when the eye proximity detection unit 57 is detecting an eye proximity, the display destination is the electronic viewfinder 28b, and when the eye proximity detection unit 57 does not detecting an eye proximity, the display destination is the rear display panel 28a.

As one of the operation units 70, a touch panel 70a capable of detecting a contact (a position) with respect to the rear display panel 28a is provided. The touch panel 70a and the rear display panel 28a may be configured integrally. For example, the touch panel 70a is configured so that light transmittance does not hinder the display of the rear display panel 28a, and may be a built-in type (in-cell type) that is incorporated inside the display screen of the rear display panel 28a. By associating input coordinates on the touch panel 70a with display coordinates on the display screen of the rear display panel 28a, it is possible to provide a graphical user interface (GUI) as though the user can directly operate the display screen of the rear display panel 28a. The system control unit 50 can detect the following states or user operations with respect to the touch panel 70a.

- Detection of a finger or a pen that was not touching the touch panel 70a having newly touched the touch panel 70a, that is, detecting that the start of a touch (hereinafter, referred to as a touch-down).
- Detection of a state in which the touch panel 70a is being touched with a finger or a pen (hereinafter referred to as a touch-on).
- Detection of a state in which a finger or pen that is touching the touch panel 70a is moving (hereinafter referred to as a touch-move).
- Detection that a finger or pen that was touching the touch panel 70a is released, that is, detecting the end of a touch (hereinafter referred to as a touch-up).
- Detection of a state in which nothing is touching the touch panel 70a (hereinafter referred to as a touch-off).

When a touch-down is detected, a touch-on is also detected at the same time. After the touch-down, the touch-on usually continues to be detected as long as no touch-up is detected. A touch-on is detected while a touch-move is detected. Even if a touch-on is detected, if the touch position does not move, a touch-move is not detected. After a touch-up of all fingers and pens that were touching is detected, a state of a touch-off is entered.

These operations and states, and the position coordinates at which a finger or pen is touching the touch panel 70a are notified to the system control unit 50 via the internal bus, and the system control unit 50 determines what kind of operation has been performed on the touch panel 70a based on the notified information. For example, with respect to a touch-move, the system control unit 50 can determine each of a vertical component and a horizontal component on the touch panel 70a for the movement direction of a finger or pen moving on the touch panel 70a based on change of position coordinates. Further, it is assumed that a stroke is drawn when a touch-up is performed on the touch panel 70a after a predetermined touch-move from a touch-down.

An operation of quickly drawing a stroke is called a flick. A flick is an operation in which a finger is moved quickly by a certain distance while touching the touch panel 70a and the finger is simply released, in other words, a flick is an operation in which a finger quickly traces over the touch panel 70a. When it is detected that a touch-move is performed at a predetermined speed or more over a predetermined distance or more and a touch-up is detected in the present state, it can be determined that a flick has been performed. In addition, it is assumed that, when it is detected that a touch-move has been performed over a predetermined distance or more and at a speed lower than the predetermined speed, it is determined that dragging has been performed. Further, a touch operation in which a plurality of points (for example, two points) are touched at the same time to bring the touched positions closer to each other is referred to as a pinch-in, and a touch operation in which touched positions are moved away from each other is referred to as a pinch-out. Pinch-out and pinch-in are collectively referred to as pinch operations (or simply pinching).

The touch panel 70a may be a touch panel of any of various types such as a resistive film type, an electrostatic capacitance type, a surface acoustic wave type, an infrared type, an electromagnetic induction type, an image recognition type, and an optical sensor type. According to the type, there is a method of detecting that there was a touch because there was a contact with the touch panel, or a method of detecting that there was a touch because a finger or a pen has approached the touch panel, but any method may be used.

In the above-described digital camera 100, image capturing using center single-point AF, face AF, or eye detection AF is possible. Center single-point AF is performing AF on one point at a center position in an image capturing screen. Face AF is performing AF on a face in an image capturing screen detected by the face detection function. Eye detection AF is performing AF on an eye included in a face in an image capturing screen that is detected by an organ detecting function which is also a type of a face detection function.

The face detection function will be described. As described above, the system control unit 50 and the image processing unit 24 function as a detection unit capable of detecting a face and an organ of the face (such as an eye, a nose, a mouth, or an ear) from an image. The system control unit 50 sends image data of a face detection target to the image processing unit 24. Under the control of the system control unit 50, the image processing unit 24 applies a horizontal bandpass filter to the image data. Under the control of the system control unit 50, the image processing unit 24 applies a vertical bandpass filter to the image data. By applying these horizontal and vertical bandpass filters, edge components are detected from the image data.

Thereafter, the system control unit 50 performs pattern matching on the detected edge components, and extracts a group of candidates for organs of a face such as eyes, nose, mouth, and ears. Then, the system control unit 50 determines an eye that satisfies a preset condition (for example, a distance, a tilt, or the like of the second eye) from an extracted eye candidate group, and narrows down the eye candidate group. Then, the system control unit 50 associates the narrowed-down eye candidate group with other parts (organs such as nose, mouth, and ears) that form the corresponding face, and detects the face by applying a preset non-face condition filter. According to face detection results, the system control unit 50 outputs face information such as the number of detected faces, the position, size, and orientation of each face, the position and size of the organs (eyes, nose, mouth, ears) included therein, and the like, and ends the processing. At this time, the system control unit 50 stores feature amounts such as the number of faces in the system memory 52. A region once detected as a face continues to be detected as a face for a predetermined period of time (about 1 second) if conditions such as contrast, color, size, and the like are met. As a result, even if an organ of a face is not detected due to the object temporarily having faced backward, the eyes being shut, or the like, it is possible to continue to detect the region as a face.

The system control unit 50 determines an eye that is extracted for the face detected by the above-described face detection function as a detected eye (eye), and outputs eye information as the eye detection result. The eye information includes, for example, the position of the eye in the image, the position and size of the eye in the face, and an eye region based on the position and size of the eye. Eye detection is a type of organ detection that detects an element (a part) of a face.

As described above, it is possible to detect specific object information such as a face or an eye by performing image analysis on image data that is to be subject to a live view display or a reproduction display, and extracting a feature amount of the image data.

Note that face AE, face FE, and face WB can be performed simultaneously with face AF. Face AE is optimizing the exposure of the entire screen in accordance with the brightness of the detected face. Face FE is dimming of the flash around a detected face. Face WB is optimizing the WB of the entire screen in accordance with the color of the detected face.

In addition, the system control unit 50 can also detect, by using the image processing unit 24, an object (an object other than a face or an organ of a person) assumed to be a main object based on conditions such as color, contrast, and motion vector.

In addition, in the digital camera 100, it is possible to set one AF mode, from a plurality of AF modes, in accordance with a user operation, as an operation mode of the auto focus (AF) at a time of image capturing. The setting of the AF mode is performed based on a user operation on the AF mode setting screen displayed by selecting a menu item for setting the AF mode on the setting menu screen. A plurality of AF modes are prepared for each method of deciding a position where the AF is performed. In the present embodiment it is assumed that either the single-point AF mode or the tracking priority mode can be set as the AF mode.

The single-point AF mode is an AF mode in which an AF frame indicating a focus adjustment position is set at the center of the image capturing range or at a point designated by the user. In the single-point AF mode, the AF frame does not move even if there is a change in the object, and AF is performed based on information obtained from the position of the AF frame (contrast value or defocus amount for phase difference AF) regardless of whether or not an object such as a face is detected.

In the tracking priority mode, when there is no tracking designation from the user (a tracking standby state or a tracking release state), an object determined by the digital camera 100 as a main object automatically becomes the AF target (the focus adjustment position). When the face of a person is detected, an eye or face of the detected person is preferentially set as the AF target, as the main object. When the face of a person is not detected, the digital camera 100 automatically decides the main object according to predetermined conditions such as whether there is a moving object, an object having a high contrast value, and an object near the center, and sets the main object as an AF target. After a tracking designation is made by a user, the object designated in the LV image continues to be tracked, and even if the position of the object being tracked changes within the capturing range, the object being tracked is set as the AF target. For example, in a case where a user has made a tracking designation of an eye or face of a person A (tracking underway), even if the person A moves in an LV image, the eye or face of the person A continues to be tracked, and is set as an AF target.

In addition, something other than a person can be a tracking target (object tracking), and even if the same object moves in the LV image, tracking continues with a condition such as the color, contrast, or shape, of the position for which a tracking designation was made, and the object is set as an AF target. That is, the tracking priority mode is an AF mode in which the AF position can be decided by performing tracking. Note that the AF mode is not limited to the single-point AF mode and the tracking priority mode. For example, there may be an AF mode ("zone AF") in which tracking is performed within a limited region designated by the user. The set AF mode is stored in the nonvolatile memory 56, and is read out to the system memory 52 in image capturing mode processing.

Here, an image capturing element used in the image capturing unit 22 of the present embodiment will be described. The image capturing element is configured by a C-MOS sensor and peripheral portions thereof, and a plurality of pixel units are arranged in a matrix: m pixel units in a horizontal direction and n pixel units in a vertical direction. Each pixel unit has one photoelectric conversion element. The image capturing element has two types of pixel units: image capturing pixel units and a focus detection pixel units. For each set of pixels of 2 rows×2 columns, a pair of G pixels arranged diagonally are set as an image capturing pixel unit, and an R pixel or a B pixel may be set as a focus detection pixel unit.

A focus detection pixel unit belongs to one of two groups that receive a light flux passing through regions of different exit eyes of the image capturing optical system. As a result, an A image signal and a B image signal having parallax with respect to each other are obtained from respective focus detection pixel groups of the two groups, and it is possible to perform known phase difference type focus detection. As described above, in an image capturing element, it is possible to perform so-called image capturing surface phase difference type focus detection in which phase difference type focus detection is performed based on a signal obtained from the image capturing element.

The system control unit 50 performs a phase difference focus detection process using the A image signal and the B image signal obtained from focus detection pixel units. More specifically, the system control unit 50 calculates the amount of image deviation between the A image signal and the B image signal, which are a pair of image signals having parallax, by a known correlation computation. The defocus amount is calculated by multiplying the amount of image deviation by a predetermined coefficient, and a drive amount of the focus lens is calculated based on the defocus amount.

Although the above-described configuration is exemplified as a configuration for performing focus detection in the present embodiment, a different configuration may be used as long as it is capable of performing focus detection. For example, focus detection of an image capturing surface phase difference type may be realized by a different pixel configuration, or focus detection of a known contrast type may be employed. In addition, phase difference type focus detection may be realized by using a dedicated sensor for focus detection.

Figure 2:
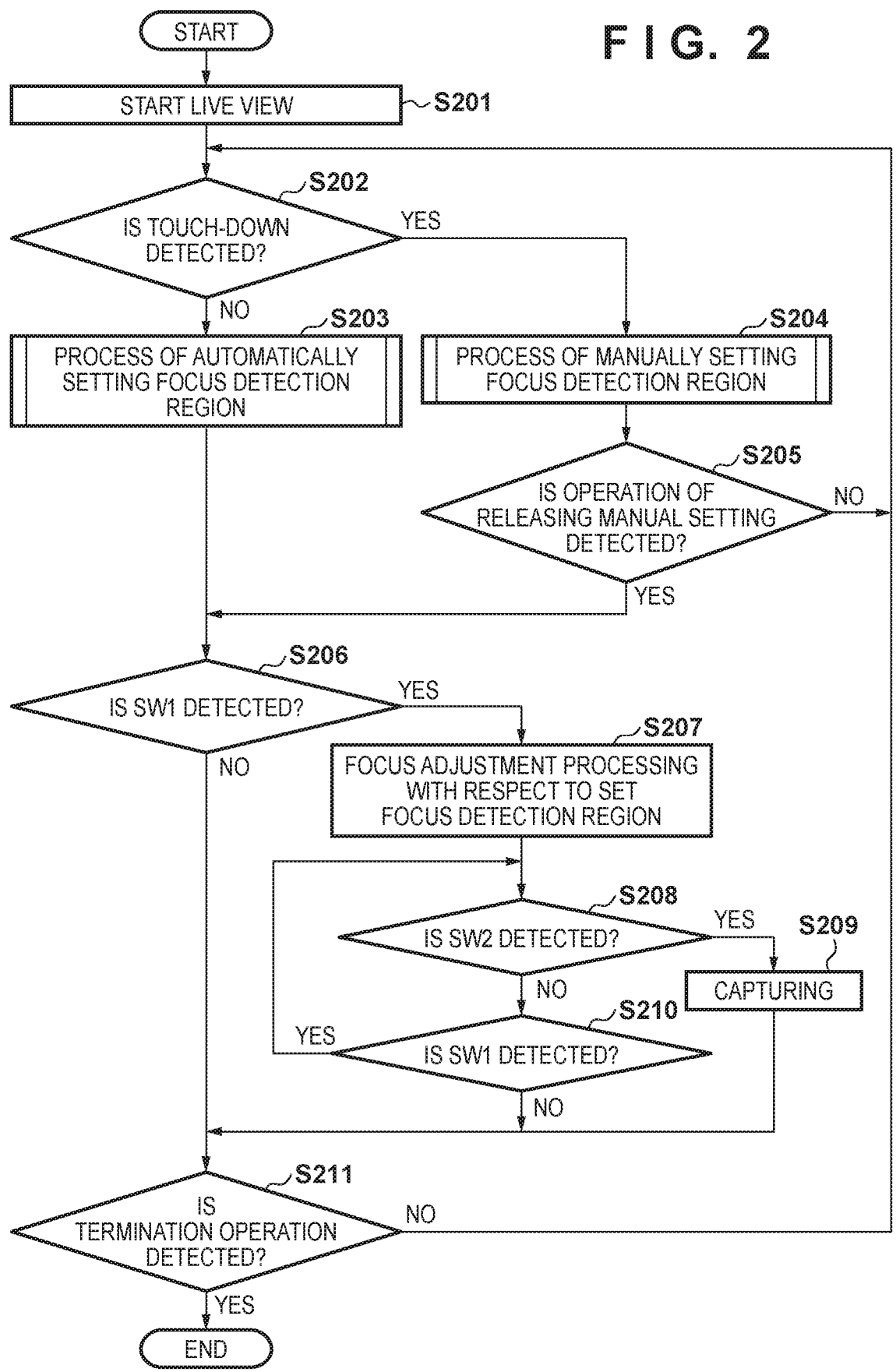
FIG. 2 is a flowchart illustrating image capturing mode processing in the embodiment.

FIG. 2 is a flowchart illustrating image capturing mode processing of the digital camera 100 according to the present embodiment.

In step S201, the system control unit 50 starts a live view. More specifically, the system control unit 50 causes the image processing unit 24 to convert a video image obtained through the image capturing unit 22 into an image for display, writes the image to the memory 32, and causes the display unit 28 to display the image that was written to the memory 32. The system control unit 50 repeats this operation to thereby display images captured by the image capturing unit 22 as a live view. At this timing, the system control unit 50 and the image processing unit 24 start detection processing for detecting a face and an eye from the displayed image. Face and eye detection is repeatedly performed, and the system control unit 50 uses results of the detection.

In step S202, the system control unit 50 determines whether or not a touch-down operation on the touch panel 70a is detected. When it is determined that a touch-down operation on the touch panel 70a is detected in step S202, the process proceeds to step S204, and when it is determined that a touch-down operation is not detected, the process proceeds to step S203. Here, the system control unit 50 obtains a position designated by a user on the display screen on which the image is displayed, based on the detected touch-down operation. In step S203, the system control unit 50 performs a process of automatically setting a focus detection region which is to be a focus adjustment target. The process of automatically setting the focus detection region is a process in which the digital camera decides the focus detection region during the live view, and details thereof will be described later with reference to the flowchart of FIG. 3. In step S204, the system control unit 50 performs a process of manually setting a focus detection region. The process of manually setting the focus detection region is a process for deciding the focus detection region based on a position of a touch-down that was detected during the live view, and details thereof will be described later in accordance with the flowchart of FIGS. 4A and 4B.

In step S205, the system control unit 50 determines whether or not manual setting of the focus detection region has been released. An operation of releasing the manual setting of the focus detection region may be, for example, a predetermined operation on an operation member of the operation unit 70, or a touch-down on a specific location of the touch panel 70a. When it is determined in step S205 that an operation of releasing the manual setting of the focus detection region has been performed, the process proceeds to step S206, and when it is determined that an operation of releasing the manual setting has not been performed, the process returns to step S202.

In step S206, the system control unit 50 determines whether or not the first shutter switch signal SW1 obtained from the first shutter switch 62 is detected during operation of the shutter button 61 (a half press). When the first shutter switch signal SW1 is detected, the process proceeds to step S207, and when the first shutter switch signal SW1 is not detected, the process proceeds to step S211.

In step S207, the system control unit 50 performs focus detection processing on the focus detection region set by the region selection processing in step S203 or step S204, and drives the focus lens of the image capturing lens 103 in accordance with the focus detection result. In this manner, focus adjustment is performed using the focus detection region which was manually or automatically set. In step S208, the system control unit 50 determines whether the second shutter signal SW2 obtained from the second shutter switch 64 is detected. The second shutter switch 64 outputs a second shutter signal SW2 in accordance with operation of the shutter button 61 completing (a full press). If the system control unit 50 detects the second shutter switch signal SW2 in step S208, the process proceeds to step S209, and if the second shutter switch signal SW2 is not detected, the process proceeds to step S210.

In step S210, the system control unit 50 determines whether or not the first shutter switch signal SW1 is detected. As a result, it is confirmed whether the first shutter switch signal SW1 is maintained or not (whether a half-pressed state of the shutter button 61 is maintained or not). When the first shutter switch signal SW1 is detected in step S210, the process returns to step S208, and when the first shutter switch signal SW1 is not detected, the process proceeds to step S211.

In step S209, the system control unit 50 performs an image capturing operation. In step S211, the system control unit 50 determines whether or not a termination operation (termination of the recording mode) is detected. In step S211, when the system control unit 50 detects the termination of the recording mode, this flow is ended, and if the termination of the recording mode is not detected, the process returns to step S202. The system control unit 50 determines the termination of the recording mode when, for example, the mode changeover switch 60 detects a power-off setting or that a mode setting other than the recording mode, such as the reproduction mode or the PC connection mode, has been made.

Figure 3:
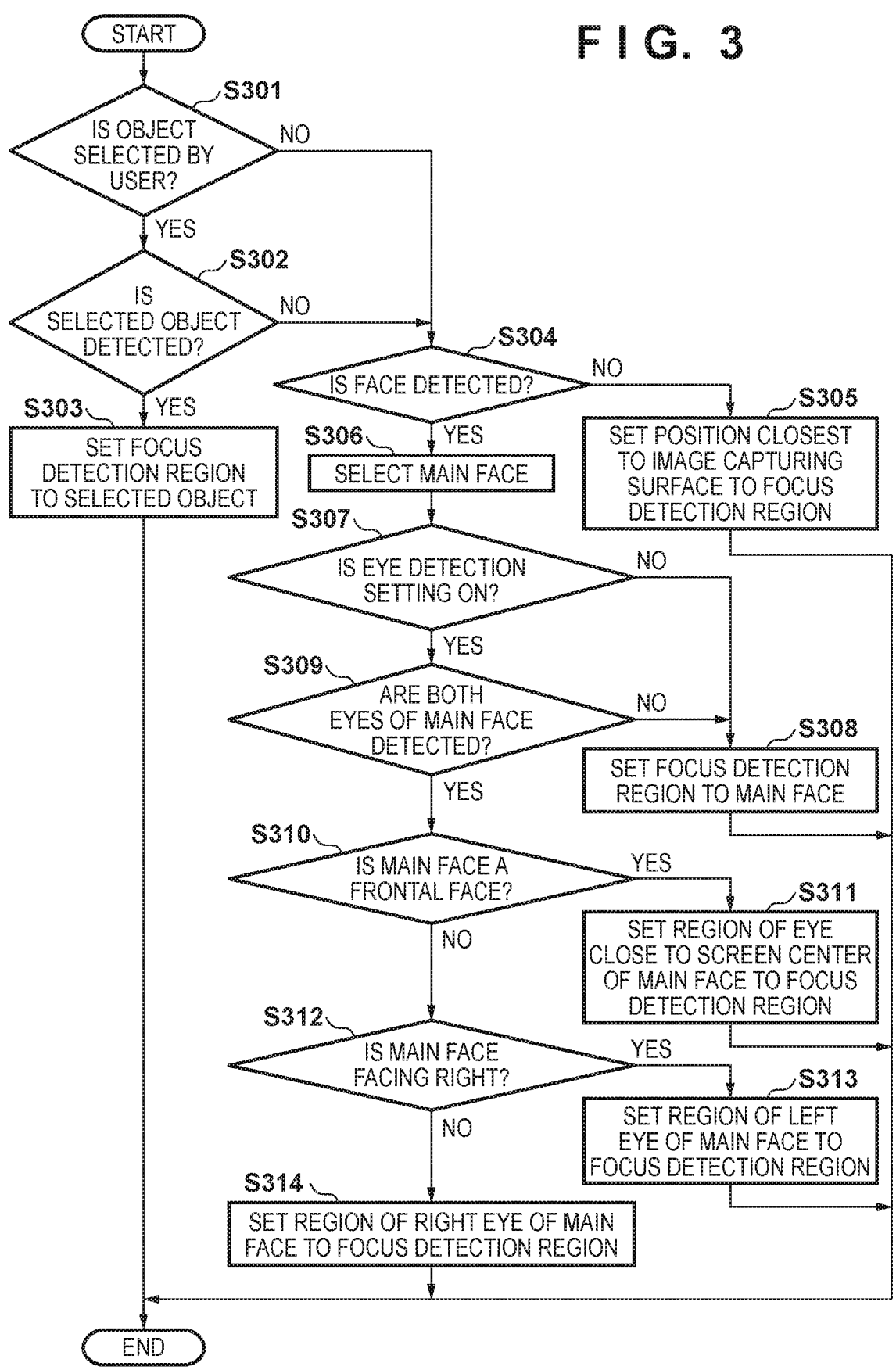
FIG. 3 is a flowchart illustrating a process of automatically setting a focus detection region in the embodiment.

Next, the process of automatically setting the focus detection region (step S203) will be described with reference to the flowchart of FIG. 3. The process of automatically setting the focus detection region is a region selection process in which the digital camera automatically decides the focus detection region during a live view.

In step S301, the system control unit 50 determines whether or not an object to be a target of focus detection is selected by a touch-down operation by a user. It is possible to select an object that is to be a target of focus detection by the performance of a touch-down at the position on which the object selected by the user of the touch panel 70a is displayed. When it is determined that an object to be a target of focus detection is selected in step S301, the process proceeds to step S302, and when it is determined that an object is not selected, the process proceeds to step S304.

In step S302, the system control unit 50 determines whether or not the object selected as a target of focus detection is being detected (whether or not the object is present in the live view image). The selected object (region) is a region of the object selected in the focus detection region by the preceding automatic setting process (step S203) or manual setting process (step S204). For example, when an object selected by the user has disappeared from the image, it is determined that the selected object is not detected. When it is determined in step S302 that the selected object is detected, the process proceeds to step S303, and when it is determined that the selected object is not detected, the process proceeds to step S304. In step S303, the system control unit 50 sets the region (the focus detection region) to be a target of focus detection as the region of the selected object, and ends the present process. When this processing ends, the processing proceeds to step S206 of FIG. 2.

The processing after step S304 is a process of automatically selecting the focus detection region, which is executed if the object selected based on the user's touch-down position (designated position) is not present in the image (live view image). In the automatic selection process, if an eye is present in the image, a region of the eye is automatically selected. When there are a plurality of eyes, from among these eyes, an eye closer to the camera or an eye that is larger in the captured image is selected. The system control unit 50 may perform a frame display process of displaying a frame (AF frame) indicating a region set in the focus detection region on the display screen of the display unit 28 (overlappingly displayed on the live view image). The processing after step S304 is processing that can also be used for setting a focus detection region at a time of executing face AF and eye detection AF. Even with face AF, if an eye detection setting (step S307) is on, an eye region is set as the focus detection region. However, in this case, an AF frame indicating the focus detection region is displayed so as to surround the face even if an eye region is set as the focus detection region. This is to prevent a user from being confused by the display of a frame indicating an eye region even if the user has designated face AF.

First, in step S304, the system control unit 50 determines whether or not faces are detected in the display image data of the live view. As described above, face detection is performed by the system control unit 50 and the image processing unit 24. When it is determined in step S304 that a face is detected, the process proceeds to step S305, and when it is determined that a face is not detected, the process proceeds to step S306.

In step S305, since a face has not been detected, the system control unit 50 sets one or more focus detection regions at a location closest to the image capturing surface within the image capturing angle, and terminates the present process. The reason why the focus detection region is set in a location close to the image capturing surface is that there is a high probability that the user will perform framing and capturing so as to arrange an object that they wish to focus on nearby. As an example of a method of specifying a location closest to the image capturing surface, there is a method of deciding a focus detection region by, from a state of focusing to a distance closest to the image capturing surface, moving the distance at which focusing is performed toward a far side until a region with contrast can be found.

In step S306, the system control unit 50 decides a main face from faces detected in the display image data of the live view. The main face is the face of the main object. If there is one face that is detected, that face is decided as the main face. When a plurality of faces are detected, the system control unit 50 decides the main face according to the size of the face and the position of the face. For example, a face having a larger size and closer to the center of an image that is captured as a still image or a moving image is set as a main face. For example, as illustrated in FIG. 8, an evaluation value is set according to the size of the face and the position of the face in the image. The "face size (horizontal)" in FIG. 8 is an evaluation value corresponding to the number of horizontal pixels of the detected face. The "face position from center of angle of view" is an evaluation value according to how far the center of the face is away from an image center when the distance from the image center to the diagonal of the image is 100%. For example, when the size of the face is 35 pixels and the center of the face is at the image center, an evaluation value based on the size of the face is 30, an evaluation value based on the position of the face from the image center is 50, and an overall evaluation value is 80. When a plurality of faces are detected, an overall evaluation value is obtained for each face, and the face having the highest overall evaluation value is set as the main face.

In step S307, the system control unit 50 determines whether or not the eye detection setting is on. ON/OFF of the eye detection setting can be set in accordance with a user operation. When it is determined in step S307 that the eye detection setting is on, the process proceeds to step S309, and when it is not determined that the eye detection setting is on, the process proceeds to step S308. In step S308, the system control unit 50 sets the focus detection region to the face region of the main face and ends the present process. The face region is a region including the entire face (for example, a rectangle circumscribing the face) (for example, a rectangular region of HL×WL in FIG. 9A). Note that a rectangle inscribed in the face may be a face region.

In step S309, the system control unit 50 determines whether or not both eyes are detected from the main face. If it is determined that both eyes are detected, the process proceeds to step S310, and if it is determined that both eyes are not detected, the process proceeds to step S308. Processing of step S308 is as described above.

Figure 9A:
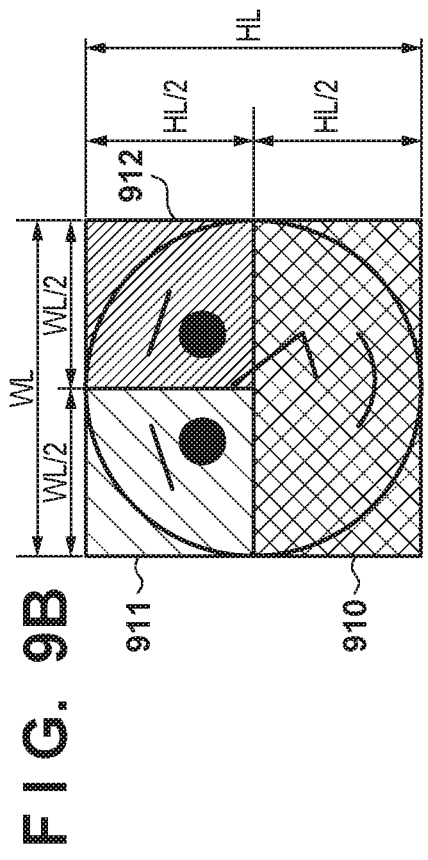
FIGS. 9A to 9D are views illustrating examples of focus detection regions in accordance with a touch-down in the embodiment.
Figure 9B:
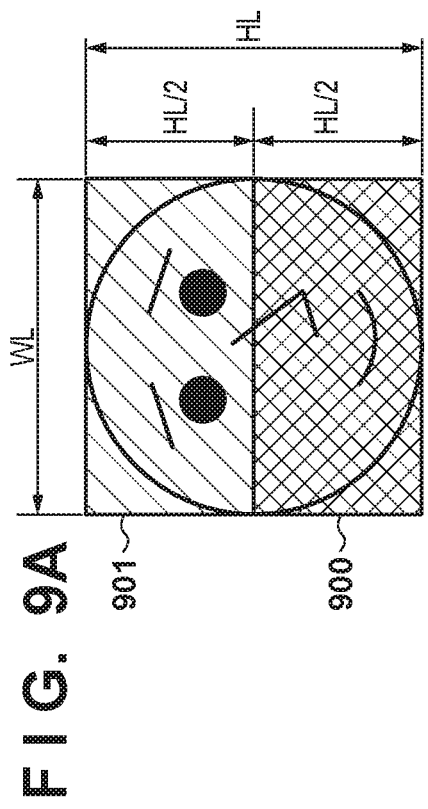
Figure 9C:
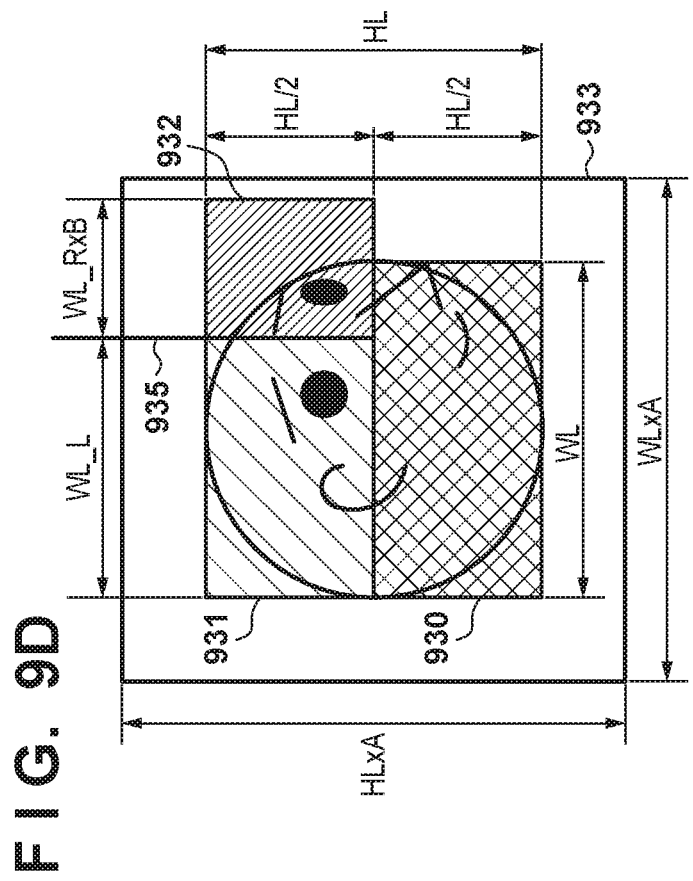

In step S310, the system control unit 50 determines whether or not the face direction of the face faces forward, that is, whether or not the main face is a frontal face. FIG. 9B illustrates a frontal face. When the face faces diagonally with respect to the camera as illustrated in FIG. 9C, the direction of the face is not forward (also referred to as a non-frontal face). Note that it is possible to determine whether or not a face is facing forward by, for example, performing pattern matching using a face facing forward as a template by the image processing unit 24, and determining that the face is facing forward when the face matches the template. In addition, it may be determined whether or not the face is a frontal face from the detected position of the face and the position of organs (such as eyes, nose, and mouth) included in the face. For example, if both of distances in the horizontal direction and the vertical direction from the center of the face to the positions of respective left and right eyes are equal, it can be determined that the face faces forward, and if not equal, it can be determined that the face does not face forward.

When it is determined in step S310 that the main face is a frontal face, the process proceeds to step S311, and when it is determined that the main face is not a frontal face, the process proceeds to step S312. In step S311, the system control unit 50 sets a focus detection region to an eye near the center of the screen from out of both eyes of the main face. For example, a region (eye region) having a size obtained by multiplying the size of the face by a predetermined ratio with the detected eye position as the center is set as a focus detection region for the eye. The setting of a focus detection region with respect to an eye is of course not limited to this, and, for example, a region that includes a detected eye position and does not include other organs (nose, mouth, or the like) may be set.

In step S312, the system control unit 50 determines whether or not the face is tilted to face rightward as seen from the camera. When it is determined in step S312 that the main face is tilted rightward, the process proceeds to step S313, and when it is determined that the main face is not tilted rightward (in this case, the main face is tilted leftward) the process proceeds to step S314. In step S313, the system control unit 50 sets a focus detection region to the left eye, as seen from the camera, of the main face, and terminates the present process. The reason why the eye region on the left is set as the focus detection region is that, in the case of a face directed rightward as seen from the camera, it is determined that the left eye as seen from the camera is on a side closer to the camera than the right eye. In step S314, the system control unit 50 sets a focus detection region to the right eye, as seen from the camera, of the main face, and terminates the present process. Note that, when the main face is not facing forward (NO in step S310), the focus detection region may be set to a larger eye in the image from among the two eyes.

Figure 4A:
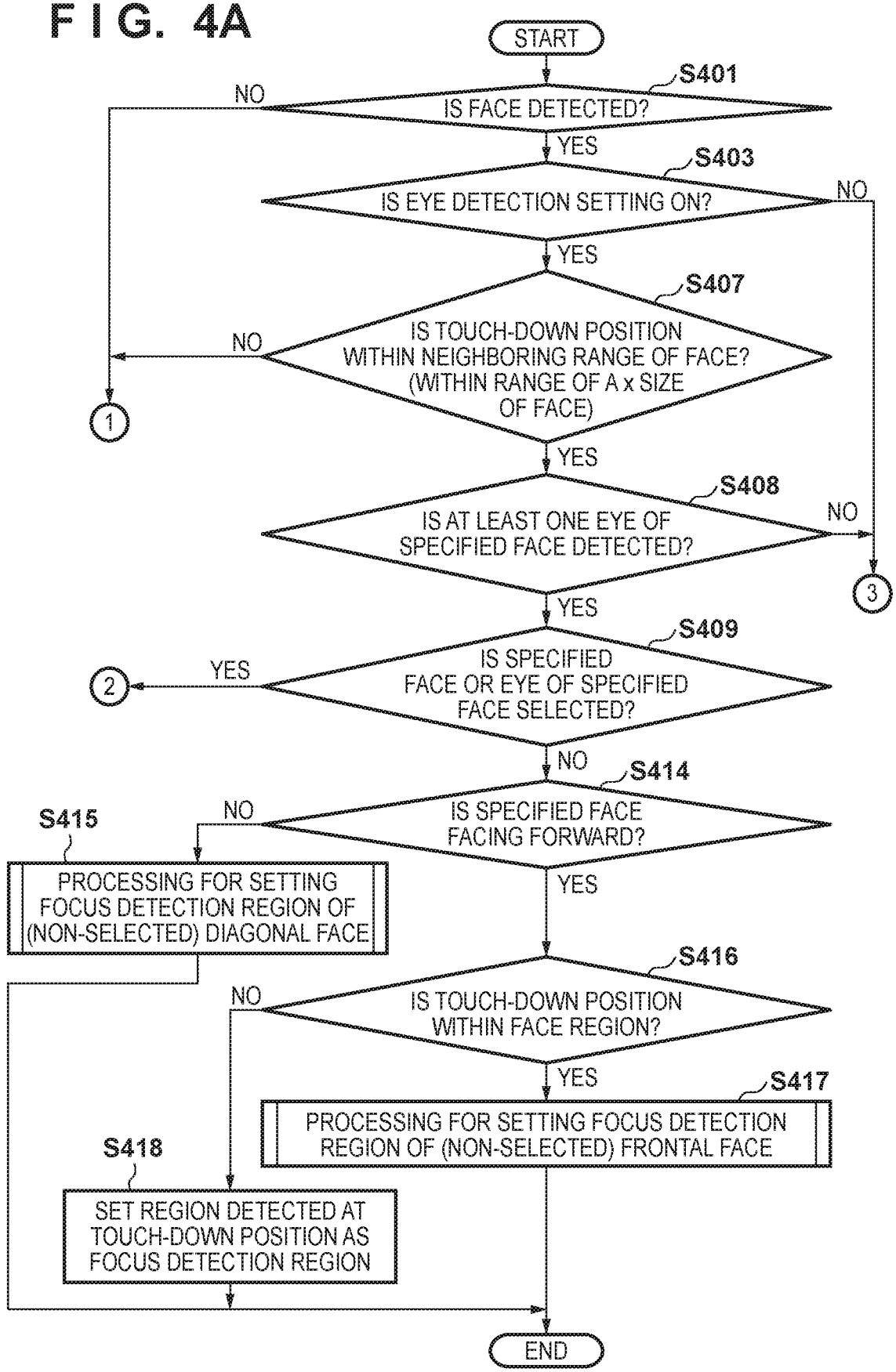

Next, the process of manually setting the focus detection region (step S204) will be described with reference to the flowchart of FIGS. 4A and 4B. The process of manually selecting the focus detection region is a region selection process for setting a focus detection region in accordance with the position of a touch-down.

In step S401, the system control unit 50 determines whether or not a face are detected in the display image data of the live view. As described above, face detection is performed by the system control unit 50 and the image processing unit 24. If it is determined that a face is detected, the process proceeds to step S403, and if it is determined that a face is not detected, the process proceeds to step S402. In step S402, the system control unit 50 causes the image processing unit 24 to perform physical object detection with respect to the touch-down position, sets the region of a detected physical object as the focus detection region, and ends the flow. When the flow ends, the process transitions to step S205 of FIG. 2. Note that the touch-down position is a position of a touch-down on the display screen on which an image is displayed (on the rear display panel 28a), and is an example of a position designated by a user on the display screen. Hereinafter, the embodiment will be described by taking the position designated by the user as a touch-down position. In addition, methods for detecting a physical object include a method of extracting a region having a more prominent color or luminance than a surrounding region to obtain a physical object region, a method of extracting a region having the same distance from the camera as a touch-down position as a physical object region, and the like.

In step S403, the system control unit 50 determines whether or not the eye detection setting is on. When it is not determined in step S403 that the eye detection setting is on, the process proceeds to step S404, and when it is determined that the eye detection setting is on, the process proceeds to step S407. In step S404, the system control unit 50 determines whether or not the touch-down position is within a face region. When it is determined in step S404 that the touch-down position is in a face region, the process proceeds to step S405, and when it is determined that the touch-down position is not in a face region, the process proceeds to step S406. In step S405, the system control unit 50 sets the face region at the touch-down position as the focus detection region, and ends the process. In step S406, the system control unit 50 performs physical object detection in accordance with the image processing unit 24 with respect to the touch-down position, sets the region of a detected physical object as the focus detection region, and ends the flow.

In step S407, the system control unit 50 determines whether or not the touch-down position is within a neighboring range of a face. For example, if it is within the region 933 of FIGS. 9C and 9D, the touch-down position is determined to be within a neighboring range of the face, and if it is outside the region 933, it is determined that the touch-down position is not in a neighboring range of the face. Therefore, the touch-down position being within a neighboring range of the face (region 933) includes a case where the touch-down position is within the face region (within the rectangular region of HL×WL). In this example, a region resulting from multiplying each of a horizontal size WL and a vertical size HL of the face by A, with respect to the center position of the face, is defined as a region 933. As long as A is a numerical value of 1 or more, any number may be used even if A is not an integer. When it is not determined in step S407 that the touch-down position is in a neighboring range of a face, the process proceeds to step S402, and when it is determined that the touch-down position is in a neighboring range of a face, the process proceeds to step S408. Step S402 is as described above.

In step S408, the system control unit 50 determines whether or not at least one of the left and right eyes of the face specified on the basis of the touch-down position is detected. In the present embodiment, description is given using a face closest to the touch-down position (including a face in which the touch-down position is present in the region thereof) as the face specified based on the touch-down position. If it is determined in step S408 that neither eye is detected, the process proceeds to step S404, and if it is determined that at least one eye is detected, the process proceeds to step S409. Processing for a case of having proceeded to step S402 is as described above.

In step S409, the system control unit 50 determines whether or not any one from out of the face closest to the touch-down position or the left or right eye of the face is already selected by a touch-down. If it is determined that a face or an eye is already selected by a touch-down, the process proceeds to step S410, and if it is determined that a face or an eye is not selected, the process proceeds to step S414.

In step S410, the system control unit 50 determines whether or not the touch-down position is within a face region. When it is determined in step S410 that the touch-down position is in a face region, the process proceeds to step S411, and when it is determined otherwise, the process proceeds to step S402.

Processing of step S402 is as described above. In step S411, the system control unit 50 determines whether or not the face of the touch-down position is a frontal face. When it is determined in step S411 that the face of the touch-down position is a frontal face, the process proceeds to step S412, and when it is not determined that the face of the touch-down position is a frontal face, the process proceeds to step S413. In step S412, the system control unit 50 executes a process of setting the focus detection region for the (selected) frontal face and ends the flow. The process of setting the focus detection region of the (selected) frontal face will be described later with reference to FIG. 5. In step S413, the system control unit 50 executes a process of setting the focus detection region for the (selected) diagonal face and ends the flow. The process of setting the focus detection region of the (selected) diagonal face will be described later with reference to FIGS. 10A and 10B.

In step S414, the system control unit 50 determines whether or not the face closest to the touch-down position (the specified face) is facing forward (a frontal face). If it is determined that the face is facing forward, the process proceeds to step S416, and if it is determined that the face is not facing forward, the process proceeds to step S415. In step S415, the system control unit 50 executes a process of setting the focus detection region for the (non-selected) diagonal face and ends the flow. The process of setting the focus detection region of the (non-selected) diagonal face will be described later with reference to FIGS. 7A and 7B.

In step S416, the system control unit 50 determines whether or not the touch-down position is within a face region. When it is determined that the touch-down position is in a face region, the process proceeds to step S417, and when it is determined that the touch-down position is not in a face region, the process proceeds to step S418. In step S417, the system control unit 50 executes a process of setting the focus detection region for the (non-selected) frontal face and ends the flow. The process of setting the focus detection region of a frontal face will be described later with reference to FIG. 6. In step S418, physical object detection in accordance with the image processing unit 24 is performed with respect to the touch-down position, the region of a detected physical object is set as the focus detection region, and then the flow ends.

Next, the process of setting the focus detection region (process of step S412) of the (selected) frontal face will be described in detail with reference to FIG. 5. A process of setting a focus detection region while a person is selected is a process of, in a state where a face or an eye of a person is already selected as a focus detection region in accordance with a touch-down, manually setting the focus detection region if the face region of the same person is subject to a touch-down again. In the present embodiment, when one eye is already selected for the focus detection region in the face specified by position designated by the user, a selection region is set for the other eye that was not selected, and a selection region is not set for the selected one eye. As a result, every time a touch-down is performed on the face region of the same person again, the eye to be a target for setting the focus detection region is switched. In the process of FIG. 5, when one eye has is already selected as the focus detection region in the face specified by the position designated by the user, an upper region obtained by dividing the specified face region into upper and lower regions is set as the selection region of the other eye that is not being selected. For example, the region 901 in FIG. 9A is set as a selection region of an eye that is not selected.

Note that, in the present embodiment, as processing for extending the selection region of the non-selected eye, the entire region 901 is a selection region for the non-selected eye, but there is no limitation to this. For example, configuration may be taken to divide the region 901 by a predetermined size ratio in which the selection region for the non-selected eye is smaller than the selection region of the selected eye, and thereby set the selection region of each eye.

In step S501, the system control unit 50 determines whether or not a touch-down position is in a lower region obtained by dividing the face region into upper and lower regions. In the present embodiment, for example, as illustrated in FIG. 9A, the face region is divided into upper and lower halves, and a region 900 is a lower region of the face, and the region 901 is an upper region. When it is determined that the touch-down position is in a lower region of the face region, the process proceeds to step S502, and otherwise, the process proceeds to step S503. A case where it is not determined that the touch-down position is in the lower region of the face region is a case where the touch-down position is in the upper region which is the part of the face region other than the lower region, for example, is the region 901 in FIG. 9A. In step S502, the system control unit 50 sets the face region as the focus detection region.

In step S503, the system control unit 50 determines whether or not the right eye of the person as seen from the camera has been selected by a touch-down, in other words, whether or not the right eye region has been manually set as the focus detection region. If it is determined that the right eye is selected, the process proceeds to step S504, and if it is determined that the right eye is not selected, the process proceeds to step S507. In step S504 (a case where the right eye is selected) the system control unit 50 determines whether the left eye of the person as seen from the camera is detected. If it is determined in step S504 that the left eye is detected, the process proceeds to step S505, and if it is not determined that the left eye is detected, the process proceeds to step S506.

In step S505, the system control unit 50 sets the left eye region as the focus detection region, and ends the flow. In step S506, the system control unit 50 sets the face region as the focus detection region, and ends the flow. When this flow ends, the process of manually setting the focus detection region of FIGS. 4A and 4B also ends, and the processing transitions to step S205 of FIG. 2.

In step S507 (a case where the left eye is selected) the system control unit 50 determines whether the right eye of the person as seen from the camera is detected. If it is determined that the right eye is detected, the process proceeds to step S508, and if it is not determined that the right eye is detected, the process proceeds to step S506. In step S508, the system control unit 50 sets the right eye region as the focus detection region, and ends the flow. Processing of step S506 is as described above.

Figure 6:
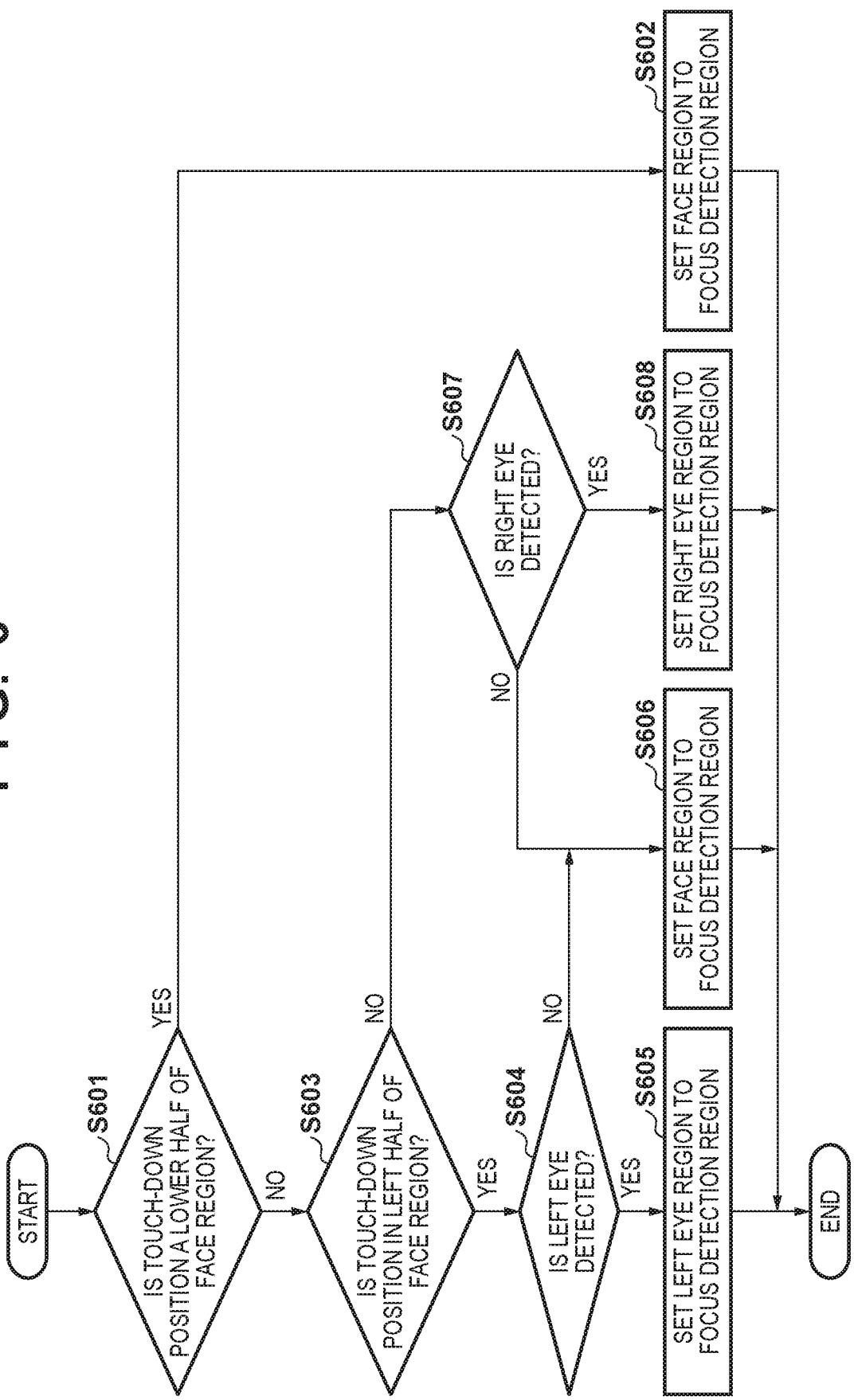
FIG. 6 is a flowchart illustrating processing for setting a focus detection region for a (non-selected) frontal face.

Next, the process of setting the focus detection region of a (non-selected) frontal face (step S417) will be described in detail with reference to FIG. 6. The process of setting a focus detection region of a (non-selected) frontal face is a process of setting a focus detection region when a face or an eye of a person has not been selected as a focus detection region and the region of a person having a frontal face is subject to a touch-down.

In step S601, the system control unit 50 determines whether or not the touch-down position is in a lower half of the face region. For example, in FIG. 9B, a region 910 is a region of the lower half of the face. When it is determined in step S601 that the touch-down position is in a lower half of the face region, the process proceeds to step S602, and when it is determined that the touch-down position is not in a lower half of the face region, the process proceeds to step S603. The case where the touch-down position is not determined to be the lower half of the face region is, for example, the case where the region 911 or the region 912 in FIG. 9B is subject to a touch-down. In step S602, the system control unit 50 sets the face region as the focus detection region, and ends the flow. When this flow ends, the process of manually setting the focus detection region illustrated by FIGS. 4A and 4B also end, and the processing transitions to step S205 of FIG. 2.

In step S603, the system control unit 50 determines whether or not a region on the left as seen from the camera of the person is subject to a touch-down, for example, whether or not the region 911 in FIG. 9B is subject to a touch-down. If it is determined that the region on the left of the face has been subject to a touch-down, the process proceeds to step S604, and if it is determined that the region on the left of the face has not been subject to a touch-down (if the region on the right of the face has been subject to a touch-down), the process proceeds to step S607. The processes of step S601 and step S603 above are equivalent to setting the left region (the region 911 in FIG. 9B) for selecting the left eye of the face, and the right region (the region 912 in FIG. 9B) for selecting the right eye, which are to be specified by a position designated by a user.

In step S604 the system control unit 50 determines whether the left eye of the person as seen from the camera is detected. If it is determined in step S604 that the left eye is detected, the process proceeds to step S605, and if it is determined that the left eye is not detected, the process proceeds to step S606. In step S605, the system control unit 50 sets the left eye region as the focus detection region, and ends the flow. In step S606, the system control unit 50 sets the face region as the focus detection region, and ends the flow.

In step S607 the system control unit 50 determines whether the right eye of the person as seen from the camera is detected. If it is determined that the right eye is detected, the process proceeds to step S608, and if it is determined that the right eye is not detected, the process proceeds to step S606. In step S608, the system control unit 50 sets the right eye region as the focus detection region, and ends the flow. Processing of step S606 is as described above.

Figure 7B:
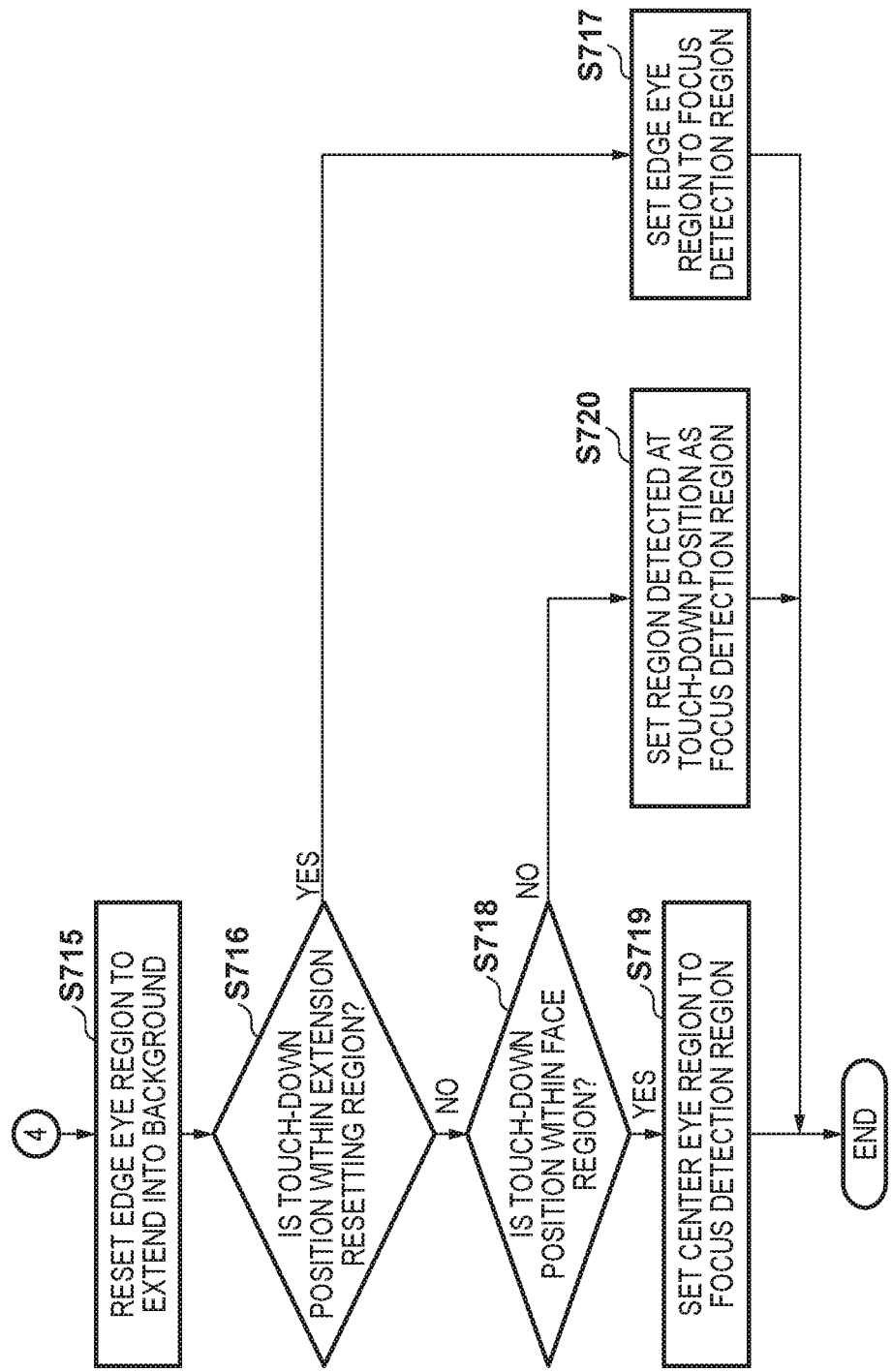

Next, the process of setting the focus detection region of a (non-selected) diagonal face (step S415) will be described in detail with reference to FIGS. 7A and 7B. The process of setting a focus detection region of a (non-selected) diagonal face is a process of setting a focus detection region when a face or an eye of a person has not been selected as a focus detection region and the region of a person who is not facing forward is subject to a touch-down.

In step S701, the system control unit 50 determines whether or not the touch-down position is in a lower half of the face region and the neighboring range. For example, in FIG. 9C, a region 920 and a region 924 in the neighboring range (region 933) are regions of the lower half of the face. When it is determined in step S701 that the touch-down position is in a lower half of the face region and the neighboring range, the process proceeds to step S702, and otherwise, the process proceeds to step S705. In step S705, the system control unit 50 determines whether both left and right eyes of the closest face from the touch-down position have been detected. If it is determined that the both of the left and right eyes are detected, the process proceeds to step S706, and if it is not determined that both of the left and right eyes are detected, the process proceeds to step S702.

In step S702, the system control unit 50 determines whether or not the touch-down position is within a face region. When it is determined that the touch-down position is in a face region, the process proceeds to step S703, and otherwise, the process proceeds to step S704. In step S703, the system control unit 50 sets the face region at the touch-down position as the focus detection region, and ends the flow. The region determined to be within the face region is, for example, the region 920 in FIG. 9C. When this flow ends, the process of manually setting the focus detection region of FIGS. 4A and 4B also ends, and the processing transitions to step S205 of FIG. 2. In step S704, the system control unit 50 performs physical object detection by the image processing unit 24 with respect to the touch-down position, sets the region of a detected physical object as the focus detection region, and ends the flow.

In step S706, the system control unit 50 sets the boundary of the selection between the left and right eyes to midway between the left and right eyes. A line 925 in FIG. 9C is an example of setting the boundary for a selection between the left and right eyes. In step S707, the system control unit 50 determines whether or not a face closest to the touch-down position is the main face. When it is determined that the face is the main face, the process proceeds to step S713, and when it is not determined that the face is the main face, the process transitions to step S708.

In step S708, the system control unit 50 determines whether or not the touch-down position is within a face region. When it is determined that the touch-down position is in a face region, the process proceeds to step S710, and otherwise, the process proceeds to step S709. In step S709, the system control unit 50 performs detection by the image processing unit 24 with respect to the touch-down position, sets the region of a detected physical object as the focus detection region, and ends the flow.

In step S710, the system control unit 50 determines whether or not the touch-down position is on the left of the boundary decided in step S706, that is, whether or not the touch-down position is in the region 921 illustrated in FIG. 9C. If it is determined that the touch-down position is left of the boundary (region 921), the process proceeds to step S711, otherwise, in other words, if it is determined that the touch-down position is right of the boundary, the process proceeds to step S712. The case where the touch-down position is on the right of the boundary is the case where it is determined that the touch-down position is in the region 922 in the case of the example of FIG. 9C. In step S711, the system control unit 50 sets the left eye region as the focus detection region, and ends the flow. In step S712, the system control unit 50 sets the right eye region as the focus detection region, and ends the flow. As described above, the system control unit 50 sets the left region for selecting the left eye of the face and the right region for selecting the right eye, which are to be specified in accordance with a position designated by a user, to each fit in the face region (step S701 and step S710). When the position designated by the user is present in the left region or the right region, the system control unit 50 selects the eye region of the corresponding eye as the focus detection region (step S711 and step S712).

In step S713, the system control unit 50 decides an eye of the face closest to the touch-down position as an edge eye. An edge eye is an eye, out of the left and right eyes, that is located at an edge of the face region. As a method of deciding an edge eye, based on the face region and the left and right eye positions, an eye closer to an edge of the face region may be decided as an edge eye. Needless to say, there is no limitation to this, and for example, an eye having a narrower region may be decided as the edge eye, based on the boundary for selection between left and right eyes that was decided in step S706. Alternatively, configuration may be taken to obtain a turning angle of the face by comparing template information for each face turning angle with the face image, and estimate from the obtained turning angle that an eye on a far side as seen from the camera is at an edge.

In step S714, the system control unit 50 obtains a degree of reliability of the edge eye, and determines whether or not the degree of reliability is equal to or greater than a threshold value A. The degree of reliability of the detection result of the eye is a numerical value (also referred to as an evaluation value) that indicates the degree of certainty of the eye detected in the eye detection, and when the numerical value is high, the certainty of the detected eye is high.

As a method of calculating the degree of reliability of the eye, for example, a degree of reliability based on the number of parts of the organ that can be detected and a degree of reliability based on a noise component included in the image are calculated and added together to obtain a final degree of reliability. The degree of reliability in accordance with the number of parts of the organ that could be detected is calculated from a number of parts that can be detected after dividing an organ into a plurality of parts. For the detection of each part, it is assumed that a part detection region corresponding to an organ to be detected is set, and the part is detected when it is determined that a region matching a part template stored in the image processing unit 24 is present in the part detection region. The degree of reliability of organ detection is calculated according to the number of parts that can be detected for one organ. For example, in the case where an organ is detected as an eye, after classifying a plurality of parts of the eye such as the iris, an inner corner of the eye, an outer corner of the eye, an upper eyelid, and a lower eyelid, the degree of reliability increases the more parts that can be detected).

Further, after extracting a noise component of an image of an organ detection region, the degree of reliability in accordance with the noise component included in the image is set to be high when the noise is determined to be small, and set to be low when the noise is determined to be high. As a method of extracting the noise component, there is, for example, a method of subtracting, from the original image of the detection region, an image obtained by applying a low-pass filter to the original image of the detection region, and taking the absolute value of the obtained difference.

Note that another method may be used to calculate the degree of reliability of organ detection. For example, the degree of reliability may be calculated by taking a luminance histogram for a region determined to be an organ and calculating a degree of matching with the luminance histogram of an organ template stored inside the image processing unit 24. Alternatively, edge information may be extracted from a region determined to be an organ, and the degree of reliability may be calculated from an edge amount. Further, the degree of reliability may be calculated by taking into account a plurality of methods. For example, the threshold value A is set by taking a threshold value at which all parts of an organ can be detected without considering a noise component as a guide.

In step S714, when it is determined that the degree of reliability of the edge eye is greater than or equal to the threshold value A, the process proceeds to step S715, and when it is not determined that the degree of reliability of the edge eye is greater than or equal to the threshold value A, the process proceeds to step S708. Processing of step S708 and thereafter is as described above.

In step S715, the system control unit 50 expands the region of the touch-down position, which is for determining whether the edge eye is the focus detection region. For example, as shown by the region 932 of FIG. 9D, the region of the touch-down position for determining whether the right eye, which is the edge eye, is the focus detection region is widened to the outside of the face region. The region is extended to include the background outside the face region by multiplying the horizontal size WL_R of the region from midway between the left and right eyes to the right edge of the face region by B. As described above, when predetermined conditions are satisfied, the system control unit 50 extends the region for selecting the eye closer to the edge of the specified face (the boundary of the face region). Here, the predetermined conditions are a condition that the specified face is the main object is satisfied (step S707), and that the degree of reliability of detecting, as an eye, an eye close to the boundary of the specified face is not less than a predetermined value (step S714). In the present embodiment, the predetermined conditions comprise that neither of a specified face or eye thereof is selected as a focus detection region (step S409), and that the specified face is not a frontal face (step S414).

Figure 9D:
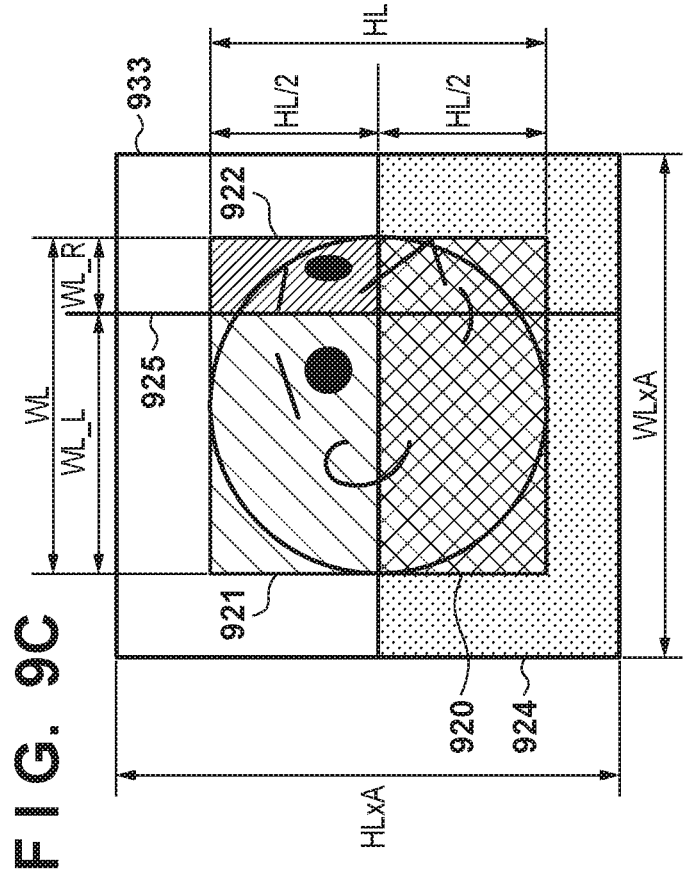

As described above, in a case of not extending the region for selecting an eye, the system control unit 50 sets both the left region (region 921) and the right region (region 922) so that they fit in the face region based on the size of the detected face, as illustrated in FIG. 9C (step S711 and step S712). In contrast, when extending a region for selecting an eye, the system control unit 50 extends an extension target region toward the outer side of the face region (step S715), as illustrated by FIG. 9D.

In step S716, the system control unit 50 determines whether or not the touch-down position is within the region that was extended in step S715 (within an extended resetting region). For example, it is determined whether or not the touch-down position is within the region 932 in FIG. 9D. When it is determined that the touch-down position is in the region that was extended in step S715, the process proceeds to step S717, and otherwise, the process proceeds to step S718.

In step S717, the system control unit 50 sets the edge eye region as the focus detection region, and ends the flow.

In step S718, the system control unit 50 determines whether or not the touch-down position is within a face region. For example, it is determined whether or not the region is within the region 931 in FIG. 9D. When it is determined in step S718 that the touch-down position is in a face region, the process proceeds to step S719, and when it is not determined that the touch-down position is in a face region, the process proceeds to step S720. In step S719, the system control unit 50 sets eye region on a center side, in other words the eye region (a center eye region) opposite the edge eye region, as the focus detection region, and ends the flow. In step S720, the system control unit 50 performs physical object detection by the image processing unit 24 with respect to the touch-down position, sets the region of a detected physical object as the focus detection region, and ends the flow.

Next, the process of setting the focus detection region of a (selected) diagonal face will be described using FIGS. 10A and 10B. The process of setting a focus detection region of a (selected) diagonal face is a process of setting a focus detection region when a face or an eye of a person has not been selected as a focus detection region and the region of a person who is not facing forward is subject to a touch-down.

In step S1001, the system control unit 50 determines whether or not a touch-down region is a lower half of a face region. For example, in FIG. 9C, the region 920 and the region 924 are regions of the lower half of a face. When it is determined in step S1001 that the touch-down region is in a lower half of a face region, the process proceeds to step S1002, and when it is determined that the touch-down region is not in a lower half of the face region, the process proceeds to step S1005.

In step S1002, the system control unit 50 determines whether or not the touch-down region is in a face region. A region determined to be within A face region is, for example, the region 920 in FIG. 9C. When it is determined in step S1002 that the touch-down region is in a face region, the process proceeds to step S1003, and when it is determined that the touch-down region is not in a face region, the process proceeds to step S1004. In step S1003, the system control unit 50 sets the face region at the touch-down position as the focus detection region, and ends the present process. In step S1004, the system control unit 50 performs physical object detection by the image processing unit 24 with respect to the touch-down position, sets the region of a detected physical object as the focus detection region, and ends the present process. When the present process ends, the process of manually setting the focus detection region of FIGS. 4A and 4B also ends, and the process transitions to step S205 of FIG. 2.

In step S1005, the system control unit 50 determines whether both left and right eyes of the closest face from the touch-down position have been detected. If it is determined in step S1005 that the both of the left and right eyes are detected, the process proceeds to step S1006, and if it is not determined that both of the left and right eyes are detected, the process proceeds to step S1002. Processing of step S1002 and thereafter is as described above. In step S1006, the system control unit 50 sets the boundary of the selection between the left and right eyes to midway between the left and right eyes. An example of the boundary between the selection of the left and right eyes is illustrated by a line 925 in FIG. 9C.

In step S1007, the system control unit 50 determines whether or not a face closest to the touch-down position is the main face. When it is determined in step S1007 that the face is the main face, the process proceeds to step S1013, and when it is not determined that the face is the main face, the process transitions to step S1008. In step S1008, the system control unit 50 determines whether or not the touch-down position is within a face region. When it is determined in step S1008 that the touch-down position is within a face region, the process proceeds to step S1010, and when it is not determined that the touch-down position is within a face region, the process proceeds to step S1009.

In step S1009, the system control unit 50 performs detection by the image processing unit 24 with respect to the touch-down position, sets the region of a detected physical object as the focus detection region, and ends the present process. In step S1010, the system control unit 50 determines whether or not the touch-down position is on the left of the boundary decided in step S1006, that is, whether or not the touch-down position is in the region 921 illustrated in FIG. 9C. When it is determined that the touch-down position is left of the boundary, the process proceeds to step S1011, and otherwise, the process proceeds to step S1012. In step S1011, the system control unit 50 sets the left eye region as the focus detection region, and ends the present process. In step S1012, the system control unit 50 determines that the region 922 illustrated in FIG. 9C has been subject to a touch-down, sets the eye region on the right as the focus detection region, and ends the present process. The processing of the above step S1008 to step S1012 is processing similar to the above-described step S708 to step S712.

In step S1013, the system control unit 50 decides an eye of the face closest to the touch-down position as an edge eye. An edge eye is an eye, out of the left and right eyes, that is located at an edge of the face region. For example, the system control unit 50, from on the face region and the left and right eye positions, decides an eye closer to an edge of the face region as an edge eye. Note that a method of deciding an edge eye is not limited to this. For example, the eye having the narrower region may be decided as an edge eye based on the boundary of the left and right eye selection that was decided in step S1006. Alternatively, configuration may be taken to obtain a turning angle of the face by comparing template information for each face turning angle with the face image, and, from the obtained turning angle, decide that an eye on a far side as seen from the camera is an edge eye.

In step S1014, the system control unit 50 determines whether an eye opposite an edge eye is already selected by the user. When it is determined in step S1014 that the eye opposite is already selected, the process proceeds to step S1015, and when it is not determined that the eye opposite is already selected, the process proceeds to step S1008. In step S1015, the system control unit 50 obtains a degree of reliability of the edge eye, and determines whether or not the degree of reliability is equal to or greater than a threshold value A. The degree of reliability of detecting an eye is as described above in step S714. When it is determined in step S1015 that the degree of reliability is greater than or equal to the threshold value A, the process proceeds to step S1016, and when it is not determined that the degree of reliability is greater than or equal to the threshold value A, the process proceeds to step S1008. Processing of step S1008 and thereafter is as described above.

With step S1016 and thereafter, the system control unit 50, after expanding the region for determining whether an edge eye is to be the focus detection region in accordance with a touch-down, sets the focus detection region based on the relationship with the touch-down position. The processing of step S1016 to step S1021 is similar to the processing of step S715 to step S720 in FIG. 7B.

By virtue of the foregoing embodiment as described above, when the face of an object is the main object, by making it easier for an eye to be selected, a user can appropriately select a focus detection region. In other words, by expanding a region that reacts as an eye region when there is a high possibility for a user to select the eye as a focus detection region, a setting of a focus detection region that aligns with a user's intent is more possible than in the past.

Figure 11:
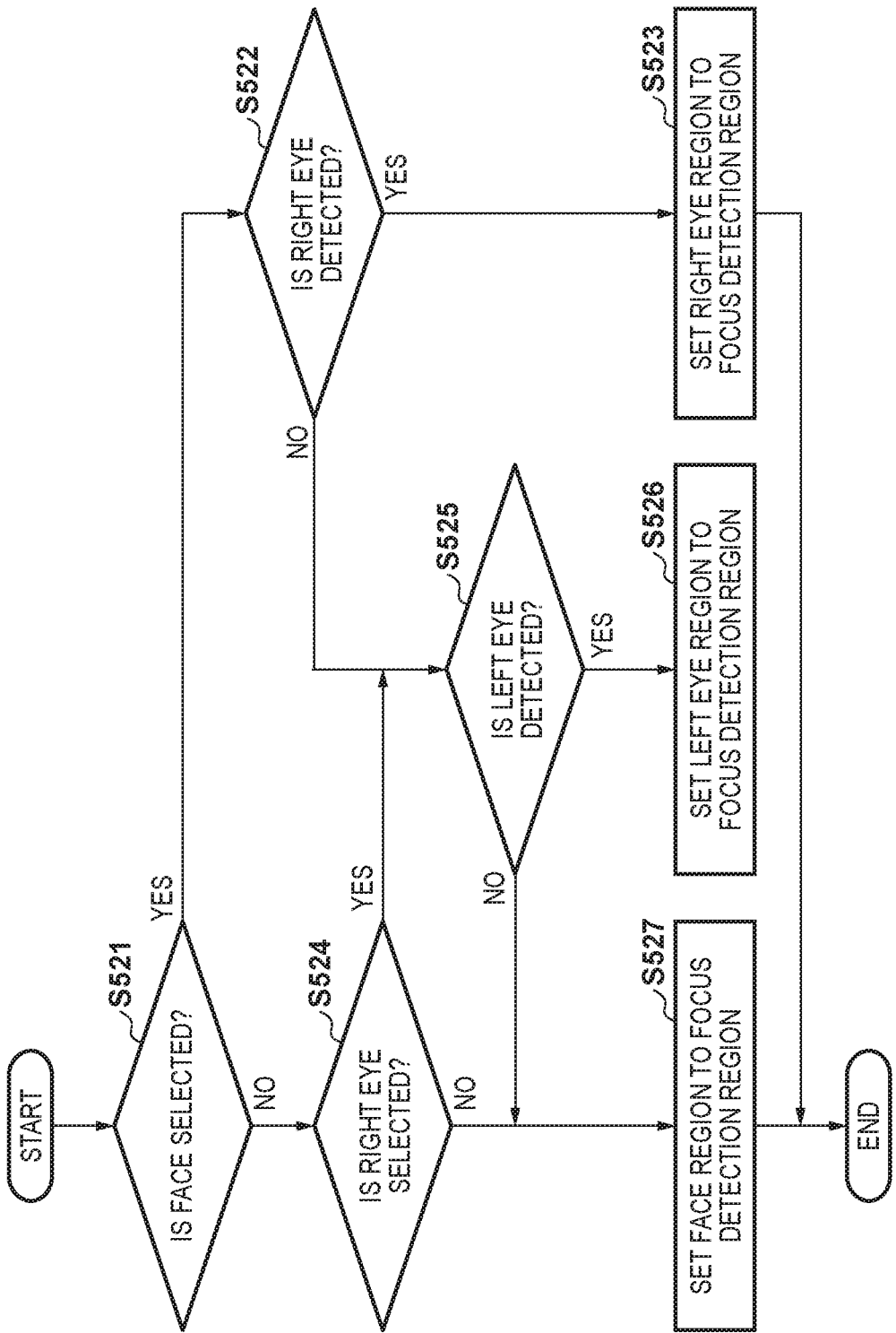
FIG. 11 is a flowchart illustrating another example of processing for setting a focus detection region for a (selected) frontal face.

Note that, in the embodiment described above, in step S411 of FIG. 4B, in a case where touch-down positions are within a frontal face region, when the face is already selected by a touch-down to the lower half of the face region, and a touch-down to the upper half of the face region is repeated, the right eye and the left eye are alternatingly selected (FIG. 5). However, there is no limitation to this. For example, in the case where touch-down positions are within the region of a frontal face, if touch-downs are repeated regardless of whether the position thereof is the lower half or the upper half, the focus detection region may be sequentially switched such as face→right eye→left eye→face. FIG. 11 is a flowchart illustrating another example of a process of setting the focus detection region for a (selected) frontal face, and illustrates a process of sequentially switching the focus detection region such as face→right eye→left eye→face in response to touch-downs. The processing illustrated in FIG. 11 details the processing of step S412 of FIG. 4B, and replaces the processing illustrated in FIG. 5.

In step S521, the system control unit 50 determines whether or not the face of a person has been selected by a touch-down, that is, whether or not a face has been manually set as the focus detection region. If it is determined that a face has been selected in step S521, the process proceeds to step S522. In step S522 the system control unit 50 determines whether the right eye of the person as seen from the camera is detected. When it is determined that the right eye is detected, the process proceeds to step S523, and the system control unit 50 sets the right eye region as the focus detection region. In contrast, when it is determined in step S522 that the right eye is not detected, the process proceeds to step S525.

When it is determined in step S521 that the face of a person is not selected, the process proceeds to step S524. In step S524, the system control unit 50 determines whether or not the right eye of the person as seen from the camera has been selected by a touch-down, in other words, whether or not the right eye region has been manually set as the focus detection region. When it is determined that the right eye region is selected as the focus detection region, the process proceeds to step S525. In step S525 the system control unit 50 determines whether the left eye of the person as seen from the camera is detected. When it is determined that the left eye is detected, the process proceeds to step S526, and the system control unit 50 sets the left eye region as the focus detection region. In contrast, when it is determined in step S525 that the left eye is not detected, the process proceeds to step S527. When it is determined in step S524 that the right eye is not selected, the process proceeds to step S527. In step S527, the system control unit 50 sets the face region as the focus detection region.

As described above, according to the processing illustrated in FIG. 11, the focus detection region is switched in the order of the face→the right eye region→the left eye region in accordance with touch operations on the face region. That is, switching is performed for the entire face region as with the face selection region→the right eye region selection region→the left eye selection region. According to such a configuration, it is not necessary to touch a narrow region, and it is possible to more reliably designate a right eye, a left eye, or a face by a touch in a wider face region. Note that, when the right eye or the left eye is not detected, skipping is performed from out of the order of face→right eye region→left eye region. For example, when the right eye is not detected, the focus detection region is switched in the order of the face→the left eye region in accordance with touch operations. Further, it is obvious that the order of switching is not limited to the face→right eye region→left eye region, and may be, for example, the face→left eye region→right eye region.

Figure 12:
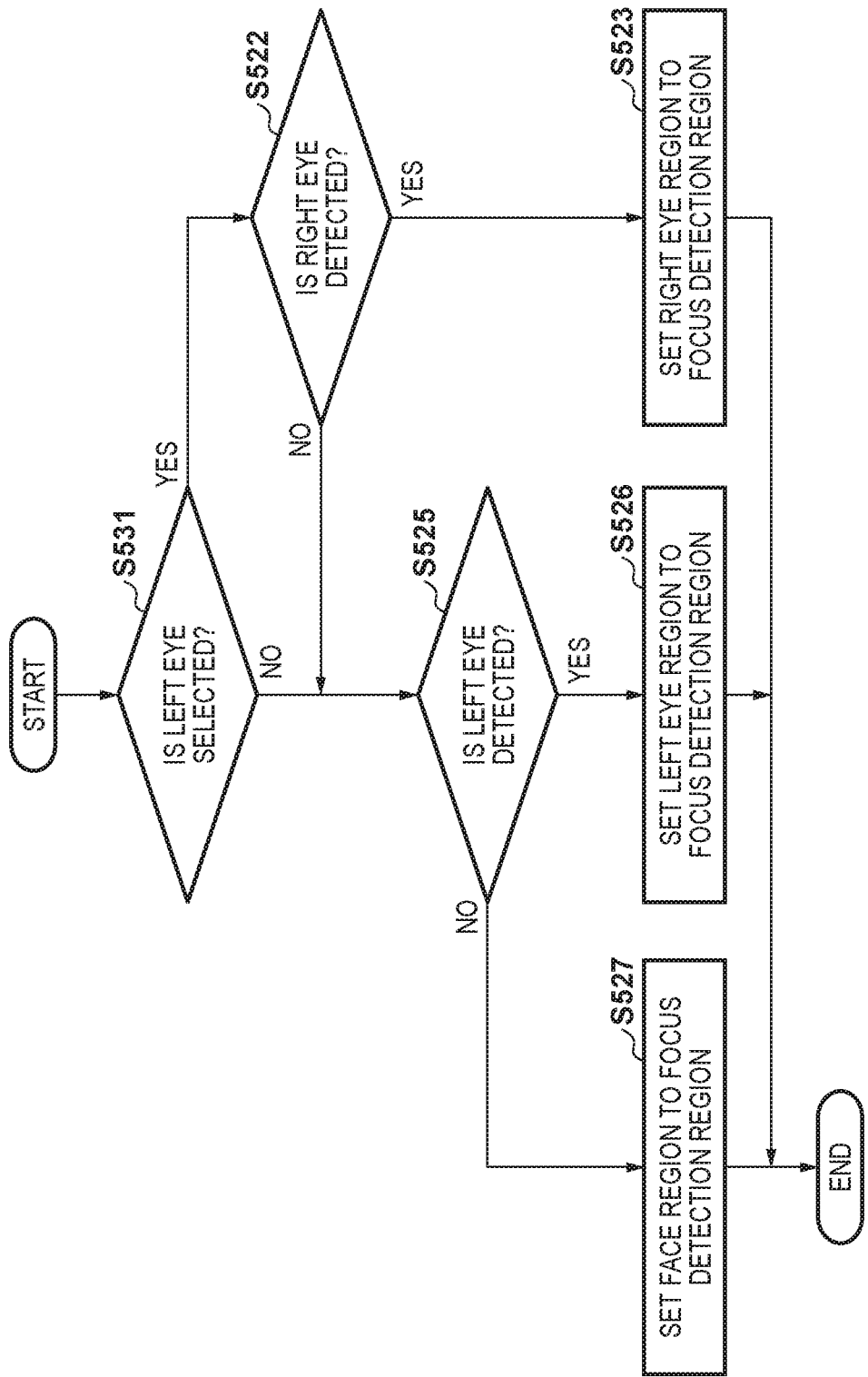
FIG. 12 is a flowchart illustrating another example of processing for setting a focus detection region for a (selected) frontal face.

Note that, in the above description, the three of the face, the left eye region, and the right eye region are sequentially switched and set as the focus detection region, but two regions—the left eye region and the right eye region—may be alternatingly set as the focus detection region. An example of such processing is illustrated by the flowchart of FIG. 12. FIG. 12 is a flowchart illustrating another example of a process for setting the focus detection region for a (selected) frontal face, and illustrates a process of alternately setting the region of the right eye and the region of the left eye as the focus detection region in accordance with touch-downs to the region of the face. Note that the processing illustrated in FIG. 12 details the processing of step S412 of FIG. 4B, and replaces the processing illustrated in FIG. 11. The same step numbers are assigned to processing similar to that in FIG. 11.

In step S531, the system control unit 50 determines whether or not the left eye of the person as seen from the camera has been selected by a touch-down, in other words, whether or not the left eye region has been manually set as the focus detection region. If the left eye region has been set as the focus detection region, the process proceeds to step S522, and if the left eye region has not been set as the focus detection region, or if neither eye region has been set as the focus detection region, the process proceeds to step S525. Processing of step S522 to step S523 and step S525 to step S527 are as described above. According to such processing, the focus detection region is sequentially switched from the region of the left eye→the right eye→the left eye→the right eye in accordance with touch-downs on the face region by a user. However, in the processing example illustrated in FIG. 12, when both the left and right eyes are not detected, the face region is selected.

In accordance with the processing described above, the system control unit 50 may perform a frame display process of displaying a frame (AF frame) indicating a region set in the focus detection region on the display screen of the display unit 28 (overlappingly displayed on the live view image).

Explanation is thus given for advantageous embodiments of the present invention, but the present invention is not limited to these embodiments, and various variations and changes are possible within the scope of the spirit of the invention. For example, in a determination of whether or not a region selected is that of the face, the face is set as the focus detection region when a touch-down of the lower half of the face is detected, but the touch-down does not need to be on half of a face. In addition, in a process of manually setting the focus detection region, it may be determined whether or not there is a diagonal face by looking at a turning angle of the face in an up or down direction, and, in a process for setting the focus detection region of a diagonal face, the region in which an edge eye is selected may be extended in the vertical direction. In the above embodiment, region selection is performed for the purpose of setting the focus detection region, but there is no limitation to this. For example, the purpose may be to set a region for exposure measurement.

Note that various controls described above as being performed by the system control unit 50 may be performed by one piece of hardware, or may be performed by a plurality of pieces of hardware (for example, a plurality of processors and circuits) sharing processing, thereby performing control of the entire apparatus.

In addition, although the present invention was explained in detail based on suitable embodiments, the present invention is not limited to these specific embodiments, and various forms of a scope that does not deviate from the spirit of this invention are included in the invention. Furthermore, each of the above described embodiments of the present invention merely indicate one embodiment and it is possible to combine embodiments as appropriate.

In the embodiment described above, the case where the present invention is applied to an image capturing apparatus has been described as an example, but there is no limitation to this example. For example, the display of the tracking frame and the detection frame can be applied to an electronic device having a function of displaying a captured image and a function of designating a position on the image. For example, the present invention can be applied to a touch operation when a captured image is reproduced to detect a face, an eye, a mouth, or a nose, and an eye to be subjected to red-eye correction is selected, or a face is selected for another reason (for example, the input of a person name). Other processes to be performed after selecting a face or an organ are as follows. The whole face or eyes are selected to apply a mosaic or mask, the eyes are selected to perform eye emphasis processing (such as enlarging), the nose is selected to perform image processing to enlarge and emphasize it, the whole face, a cheek or the like is selected to perform image processing for a beautiful skin effect, or the mouth is selected and subjected to image processing such as emphasizing the redness of the lips, or adding glossiness. As a method of selecting an organ of a face in such a case, the above-described processing can be applied to a recorded image instead of an LV image. Also, the display of an AF frame can be applied to various electronic appliances having an image capturing function. That is, the present invention can be applied to a personal computer, a PDA, a mobile telephone terminal, a portable image viewer, a printer apparatus provided with a display, a digital photo frame, a music player, a game machine, an electronic book reader, a seal printing system, and the like.

In the above embodiments, a region on a display screen is designated by a touch operation on a touch panel, but there is no limitation to this, and for example, a region on the screen (face region or eye region) may be designated by the operation of a mouse pointer in accordance with a mouse. Although, in the above embodiment, an eye is given as an example of an organ that is a tracking target, there is no limitation to this, and configuration may be taken such that it is possible to designate another organ such as a nose or mouth as a tracking target (AF target). For example, in the case where the mouth is a tracking target (AF target), the face region may be divided into upper and lower halves, and the lower region may be associated with the mouth and the upper region may be associated with the face.

In addition, the present invention can be applied not only to an image capturing apparatus main body but also to a control apparatus which communicates with an image capturing apparatus (including a network camera) via wired or wireless communication and remotely controls the image capturing apparatus. An apparatus for remotely controlling the image capturing apparatus includes an apparatus such as a smart phone, a tablet PC, and a desktop PC, for example. Based on an operation performed on the control apparatus side or processing performed on the control apparatus side, it is possible to remotely control the image capturing apparatus by making a notification from the control apparatus side to the image capturing apparatus of a command to cause the image capturing apparatus to perform various operations and settings. In addition, configuration may be such that a live view image captured by the image capturing apparatus can be received via wired or wireless communication and displayed on the control apparatus side. In addition, configuration may be such that a live view image captured by the image capturing apparatus can be received via wired or wireless communication and displayed on the control apparatus side. In this case, such a control apparatus executes AF control for controlling the AF mechanism of the image capturing apparatus. That is, the AF process described above with reference to FIG. 5A and FIG. 5B may be AF control for controlling an AF mechanism included in an external apparatus such as an image capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-178077, filed Sep. 21, 2018, which is hereby incorporated by reference herein in its entirety.

What is claimed is:
1. An electronic device comprising:
at least one processor; and
at least one memory storing instructions which, when the instructions are executed, cause the at least one processor to function as:
a detecting unit configured to detect a face and an eye from an image;
an obtaining unit configured to obtain a position designated by a user on a display screen on which the image is displayed;
a setting unit configured to set, in a face region of a face detected by the detecting unit, both a left region for selecting a left eye of a face specified by the position designated and a right region for selecting a right eye of the specified face; and
a selecting unit configured to select the left eye or the right eye based on the position designated, wherein the selecting unit selects the left eye when the position designated is present in the left region and selects the right eye when the position designated is present in the right region,
wherein, in a case where the face is facing diagonally, the setting unit:
sets sizes of the left region and the right region to different sizes according to a positional relationship between the left eye and the right eye; and
in a case where a predetermined condition is satisfied, extends a smaller size region of the left region and the right region, and
wherein the predetermined condition includes at least one of the specified face satisfying a condition for becoming a main object, a degree of reliability of detection of an eye corresponding to the smaller size region as an eye being equal to or greater than a predetermined value, and an eye corresponding to a larger size region of the left region and the right region being selected.

2. The electronic device according to claim 1, wherein the predetermined condition further comprises that none of the specified face and the eyes in the specified face is selected by the selecting unit.

3. The electronic device according to claim 1, wherein, in a case where extension of a region for selecting an eye is not performed, the setting unit sets so that both the left region and the right region fit in a face region based on a size of the face detected by the detecting unit.

4. The electronic device according to claim 1, wherein the setting unit extends the region toward the outside of a face region.

5. The electronic device according to claim 1, wherein, in a case where one eye of the specified face is already selected, the setting unit sets a selection region for the other eye that is not selected, and does not set a selection region for the selected one eye.

6. The electronic device according to claim 5, wherein an upper region obtained by dividing the specified face region into upper and lower regions is set as a selection region of the other eye which is not selected.

7. The electronic device according to claim 6, wherein when the lower region, which is the part of the specified face region other than the upper region, is designated, the selecting unit selects a region corresponding to the face.

8. The electronic device according to claim 1, wherein the specified face is a face closest to the position designated.

9. The electronic device according to claim 1,
wherein the instructions stored in the memory further cause the at least one processor to function as a determining unit configured to determine, from a face image of the specified face in the image, a turning angle of the face, and
wherein the setting unit sets the smaller region for the eye with smaller distance between the eye and an edge of the face closest to the eye based on the turning angle.

10. The electronic device according to claim 1, wherein, from out of the left and right eyes, the smaller region is set for the eye whose distance from an eye region to the electronic device is shorter.

11. The electronic device according to claim 1, wherein a region selected by the selecting unit is used as a focus detection region that is to be a target of a focus adjustment.

12. The electronic device according to claim 1, wherein the instructions stored in the memory further cause the at least one processor to function as a frame display unit configured to display, on the display screen, a frame indicating a region selected by the selecting unit.

13. The electronic device according to claim 1, wherein, in a case where an object selected based on the position designated is not present in the image, the selecting unit automatically selects a region of an eye present in the image.

14. The electronic device according to claim 13, wherein, in automatic selection by the selecting unit, a region for an eye closer to a camera or a region for an eye captured at a larger size is selected from eyes present in the image.

15. A region selection method in accordance with an electronic device, the method comprising:
detecting a face and an eye from an image;
obtaining a position designated by a user on a display screen on which the image is displayed;
setting, in a face region of a face detected in the detecting step, both a left region for selecting a left eye of a face specified by the position designated and a right region for selecting a right eye of the face; and
selecting the left eye or the right eye based on the position designated, wherein the left eye is selected when the position designated is present in the left region and the right eye is selected when the position designated is present in the right region,
wherein, in a case where the face is facing diagonally, in the setting:
sizes of the left region and the right region are set to different sizes according to a positional relationship between the left eye and the right eye; and
in a case where a predetermined condition is satisfied, a smaller size region of the left region and the right region is extended, and
wherein the predetermined condition includes at least one of the specified face satisfying a condition for becoming a main object, a degree of reliability of detection of an eye corresponding to the smaller size region as an eye being equal to or greater than a predetermined value, and an eye corresponding to a larger size region of the left region and the right region being selected.

16. A non-transitory computer-readable storage medium storing a computer program for causing a computer to execute a region selection method in accordance with an electronic device, the method comprising:
detecting a face and an eye from an image;
obtaining a position designated by a user on a display screen on which the image is displayed;
setting, in a face region of a face detected in the detecting step, both a left region for selecting a left eye of a face specified by the position designated and a right region for selecting a right eye of the face; and
selecting the left eye or the right eye based on the position designated, wherein the left eye is selected when the position designated is present in the left region and the right eye is selected when the position designated is present in the right region,
wherein, in a case where the face is facing diagonally, in the setting:
sizes of the left region and the right region are set to different sizes according to a positional relationship between the left eye and the right eye; and
in a case where a predetermined condition is satisfied, a smaller size region of the left region and the right region is extended, and the predetermined condition includes at least one of the specified face satisfying a condition for becoming a main object, a degree of reliability of detection of an eye corresponding to the smaller size region as an eye being equal to or greater than a predetermined value, and an eye corresponding to a larger size region of the left region and the right region being selected.

* * * * *